(12) United States Patent
Richter et al.

(10) Patent No.: US 11,417,067 B1
(45) Date of Patent: Aug. 16, 2022

(54) GENERATING A THREE-DIMENSIONAL ENVIRONMENT BASED ON AN IMAGE

(71) Applicant: Apple Inc., Cupertino, CA (US)

(72) Inventors: Ian M. Richter, Los Angeles, CA (US); Qi Shan, Mercer Island, WA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/242,809

(22) Filed: Apr. 28, 2021

Related U.S. Application Data

(60) Provisional application No. 63/082,974, filed on Sep. 24, 2020.

(51) Int. Cl.
    *G06T 19/00* (2011.01)
(52) U.S. Cl.
    CPC .................. *G06T 19/006* (2013.01)
(58) Field of Classification Search
    None
    See application file for complete search history.

(56) References Cited

U.S. PATENT DOCUMENTS

| 9,407,904 | B2 | 8/2016 | Sandrew et al. |
| 10,230,933 | B2 | 3/2019 | Lee et al. |
| 2014/0184550 | A1 | 7/2014 | Hennessey et al. |

OTHER PUBLICATIONS

Dachselt et al., "DesignAR: Immersive 3D-Modeling Combining Augmented Reality with Interactive Displays", 2019. (Year: 2019).*

* cited by examiner

*Primary Examiner* — Nicholas R Wilson
(74) *Attorney, Agent, or Firm* — Fernando & Partners, LLP

(57) ABSTRACT

Various implementations disclosed herein include devices, systems, and methods for synthesizing an environment based on an image. In various implementations, a device includes a non-transitory memory and one or more processors coupled with the non-transitory memory. In various implementations, a method includes determining an engagement score that characterizes a level of engagement between a user and a representation of a subject included in an image. In some implementations, the method includes, in response to the engagement score satisfying an engagement threshold, obtaining stored information regarding the subject, and synthesizing an environment based on the image and the stored information regarding the subject.

29 Claims, 18 Drawing Sheets

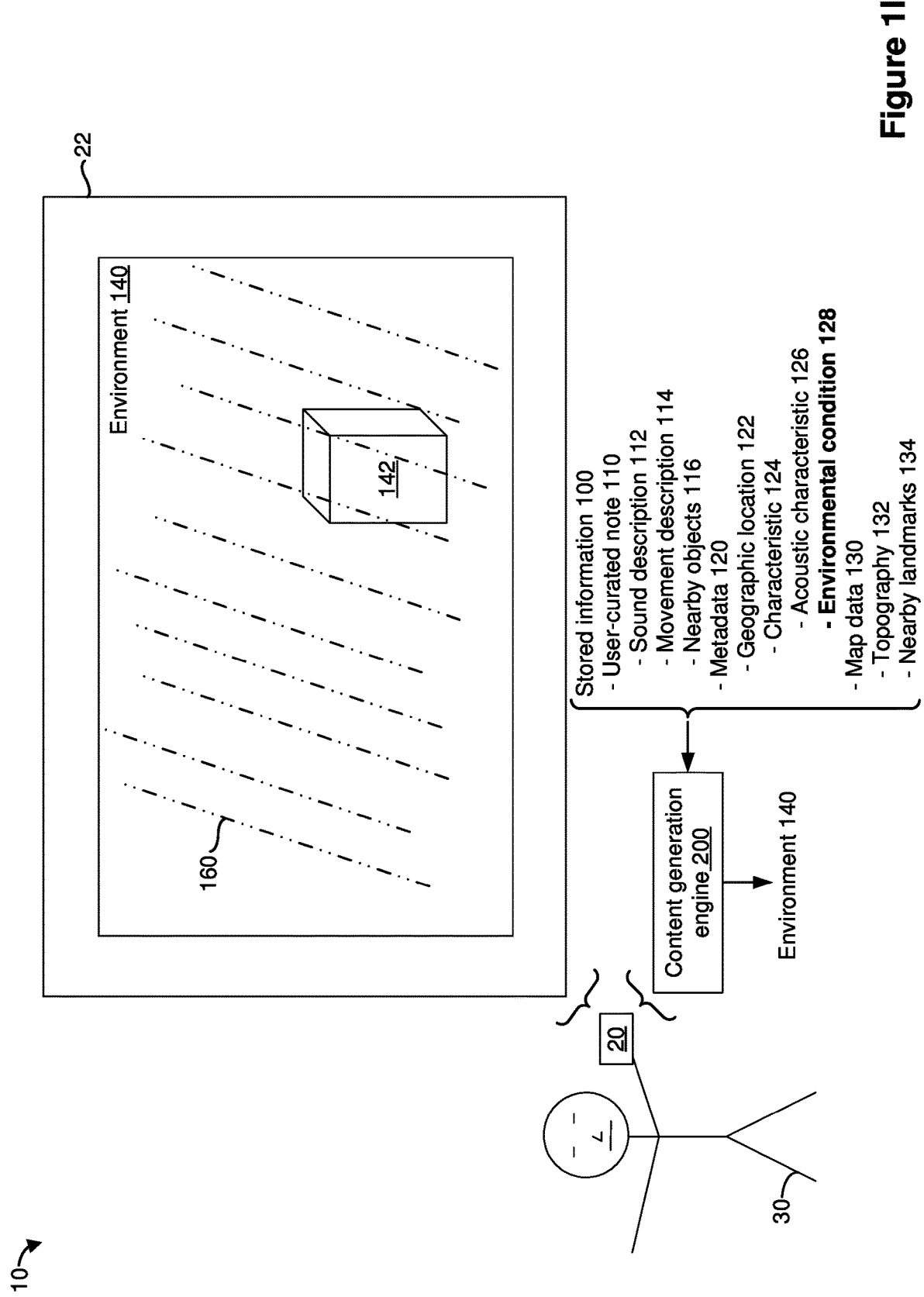

300

Determine an engagement score characterizing engagement between user and a subject in an image

- Subject is an object represented in the image 310a
- Subject includes environmental conditions represented in image 310b
- Subject includes physical environment represented in image 310c
- Detect user selection of the image in an application 310d
- Detect that the user is viewing a physical picture frame 310e

↝ 310

In response to the engagement score satisfying a threshold, obtain stored info regarding subject and synthesize env. based on stored info and the image

- Synthesize env. based on ch. specified in user-curated note 320a
- Synthesize env. based on metadata associated with image 320b
- Synthesize env. based on location-based characteristic 320c
- Synthesize env. based on map data 320d
- Stored info is private info or publicly-available info 320e
- Stored info includes audio associated with physical environment 320f
- Env. represents a different portion of phy. env. than the image 320g
- Env. shows changes in phy. env. over a period of time 320h

GENERATING A THREE-DIMENSIONAL ENVIRONMENT BASED ON AN IMAGE

CROSS-REFERENCE TO RELATED APPLICATION

This application claims the benefit of U.S. Provisional Patent App. No. 63/082,974, filed on Sep. 24, 2020, which is incorporated by reference in its entirety.

TECHNICAL FIELD

The present disclosure generally relates to generating a three-dimensional environment based on an image.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a flowchart representation of a method of synthesizing a three-dimensional (3D) computer-generated environment in accordance with some implementations.

Figure 1A:
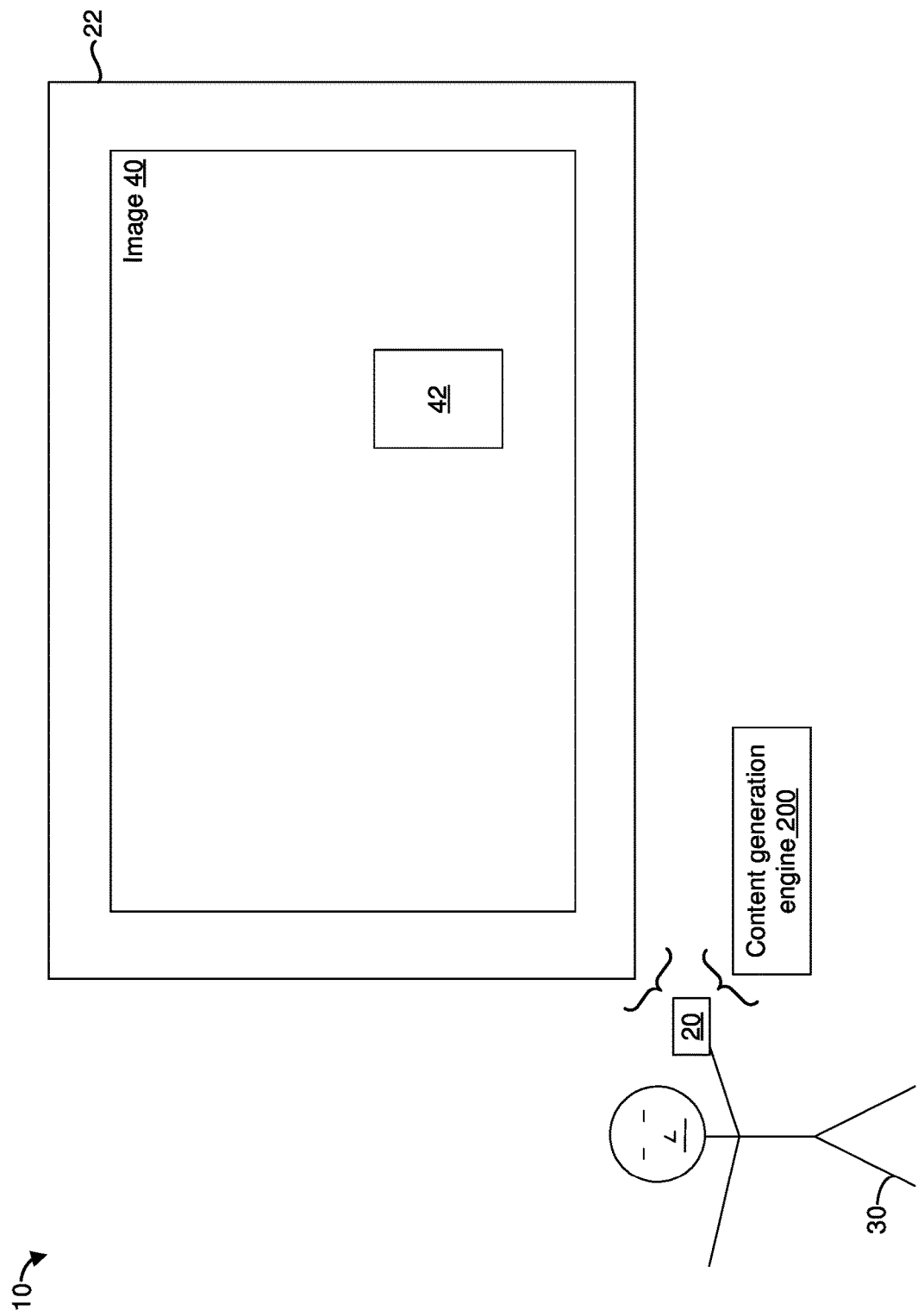
FIGS. 1A-1O are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for synthesizing a three-dimensional (3D) environment based on an image. In various implementations, a device includes a non-transitory memory and one or more processors coupled with the non-transitory memory. In various implementations, a method includes determining an engagement score that characterizes a level of engagement between a user and a two-dimensional (2D) representation of a subject included in an image. In some implementations, the method includes, in response to the engagement score satisfying an engagement threshold, obtaining stored information regarding the subject, and synthesizing a 3D environment based on the image and the stored information regarding the subject.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Many users capture numerous images with camera-enabled devices. Most devices allow their users to browse through images at a later time thereby allowing a user to experience how the user felt when the user captured a previous image. However, viewing a two-dimensional (2D) image does not provide an immersive experience because a 2D image does not capture various aspects of the physical environment that the user sensed when the user captured the image. For example, a 2D image does not convey the sounds that the user heard in the physical environment when the user captured the image. Furthermore, the 2D image may not capture portions of the physical environment that the user saw but the user was not able to capture an image of.

The present disclosure provides methods, systems and/or devices for using a 2D image to synthesize a three-dimensional (3D) computer-generated environment (e.g., an XR environment) that provides a more immersive experience than viewing the 2D image. A device generates the 3D environment based on the 2D image and stored information regarding a subject depicted in the image. For example, if the user made a note describing a sound that the subject was making when the user captured the image, the device integrates a sound that matches the description in the 3D environment to allow the user to experience the sound while viewing the 3D environment. As another example, if map data indicates the presence of a landmark near the subject, the device includes a 3D representation of the landmark in the 3D environment even though the image does not include a 2D representation of the landmark in order to provide a more immersive and complete experience to the user. As such, in various implementations, synthesizing the 3D computer-generated environment based on the image and stored information regarding the subject enhances a user experience provided by the device.

In some implementations, automatically synthesizing the 3D computer-generated environment based on the image and the stored information regarding the subject reduces a need for user inputs corresponding to manually creating the 3D computer-generated environment. In some implementations, incorporating the stored information regarding the subject into the 3D computer-generated environment reduces a need for user inputs corresponding to manually navigating to the stored information in order to recall more details regarding the subject. For example, in some implementations, incorporating 3D representations of landmarks, indicated by the map data, into the 3D computer-generated environment reduces the need for user inputs corresponding to opening a map application to learn about landmarks that were in the vicinity of the subject included in the image. In some implementations, incorporating a sound into the 3D computer-generated environment reduces the need for user inputs corresponding to searching for and playing a sound clip associated with the physical environment where the device captured the image. In some implementations, animating a 3D representation of the subject displayed in the 3D computer-generated environment reduces the need for user inputs corresponding to searching for and playing a video that shows movement of the subject. In various implementations, reducing unnecessary user inputs tends to prolong a battery life of a battery-operated device, for example, by conserving computing resources associated with interpreting and acting upon user inputs.

FIG. 1A is a diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 20 and a content generation engine 200.

In some implementations, the electronic device 20 includes a handheld computing device that can be held by a user 30. For example, in some implementations, the electronic device 20 includes a smartphone, a tablet, a media player, a laptop, or the like. In some implementations, the electronic device 20 includes a wearable computing device that can be worn by the user 30. For example, in some implementations, the electronic device 20 includes a head-mountable device (HMD) that can be worn around a head of the user 30, an electronic watch or a pair of headphones.

In some implementations, the electronic device 20 includes an optical see-through display. For example, the electronic device 20 includes an HMD with an optical see-through display. In various implementations, the optical see-through display is transparent. In some implementations, the optical see-through display includes an additive light field display ("additive display", hereinafter for the sake of brevity). In some implementations, the additive display includes a set of one or more optical holographic optical elements (HOEs). In some implementations, the additive display displays content by adding light and does not subtract or remove light.

As shown in FIG. 1A, in some implementations, the electronic device 20 includes the content generation engine 200. Although the content generation engine 200 is shown as being integrated into the electronic device 20, in some implementations, the content generation engine 200 is separate from the electronic device 20. In various implementations, the electronic device 20 displays an image 40 on a display 22 of the electronic device 20. In some implementations, the image 40 includes a two-dimensional (2D) representation 42 ("representation 42", hereinafter for the sake of brevity) of a subject. In various implementations, the image 40 includes a plurality of pixels. In some implementations, a portion of the pixels correspond to the representation 42 of the subject. In some implementations, the subject includes an object. In some implementations, the object is a physical article (e.g., a tangible object). In some implementations, the subject is a virtual object (e.g., a computer-generated object, for example, an AR object). In some implementations, the subject is a person and the representation 42 is a representation of the person. For example, in some implementations, the image 40 includes a representation of the person. In various implementations, the content generation engine 200 generates a three-dimensional (3D) computer-generated environment (e.g., an XR environment) based on the image 40.

Figure 1B:
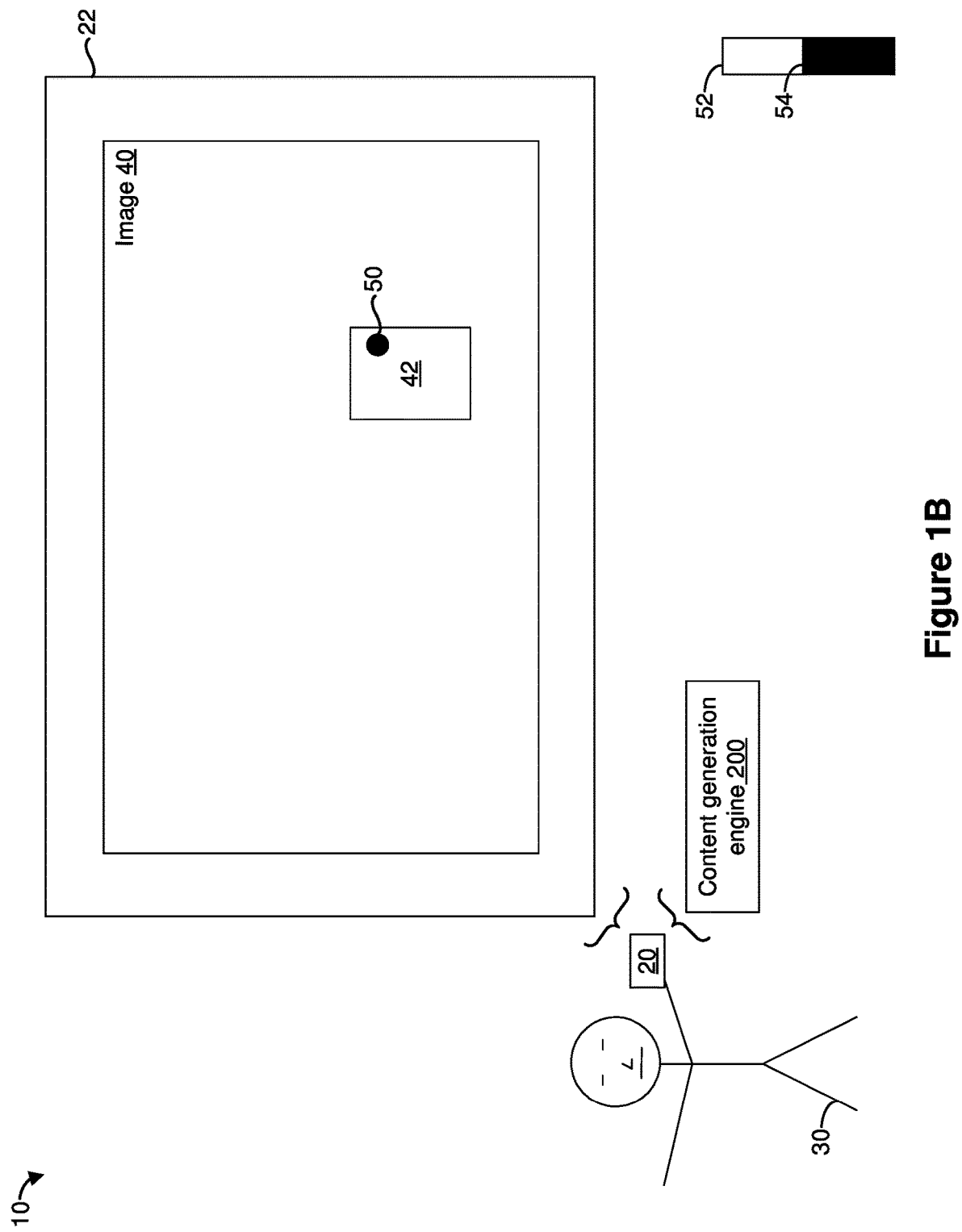

Referring to FIG. 1B, in some implementations, the electronic device 20 detects a gaze 50 directed to the representation 42 of the subject. In some implementations, the electronic device 20 determines that the gaze 50 has been directed to the representation 42 of the subject for an amount of time 52 that is greater than a threshold time 54. More generally, in various implementations, the content generation engine 200 determines an engagement score that characterizes a level of engagement between the user 30 and the representation 42 of the subject included in the image 40. As described herein, in some implementations, the amount of time 52 for which the gaze 50 has been directed to the representation 42 of the subject represents the engagement score that characterizes a level of engagement between the user 30 and the representation 42 of the subject included in the image 40. In some implementations, the content generation engine 200 interprets the gaze 50 as a user request to generate an XR environment based on the image 40.

Figure 1C:
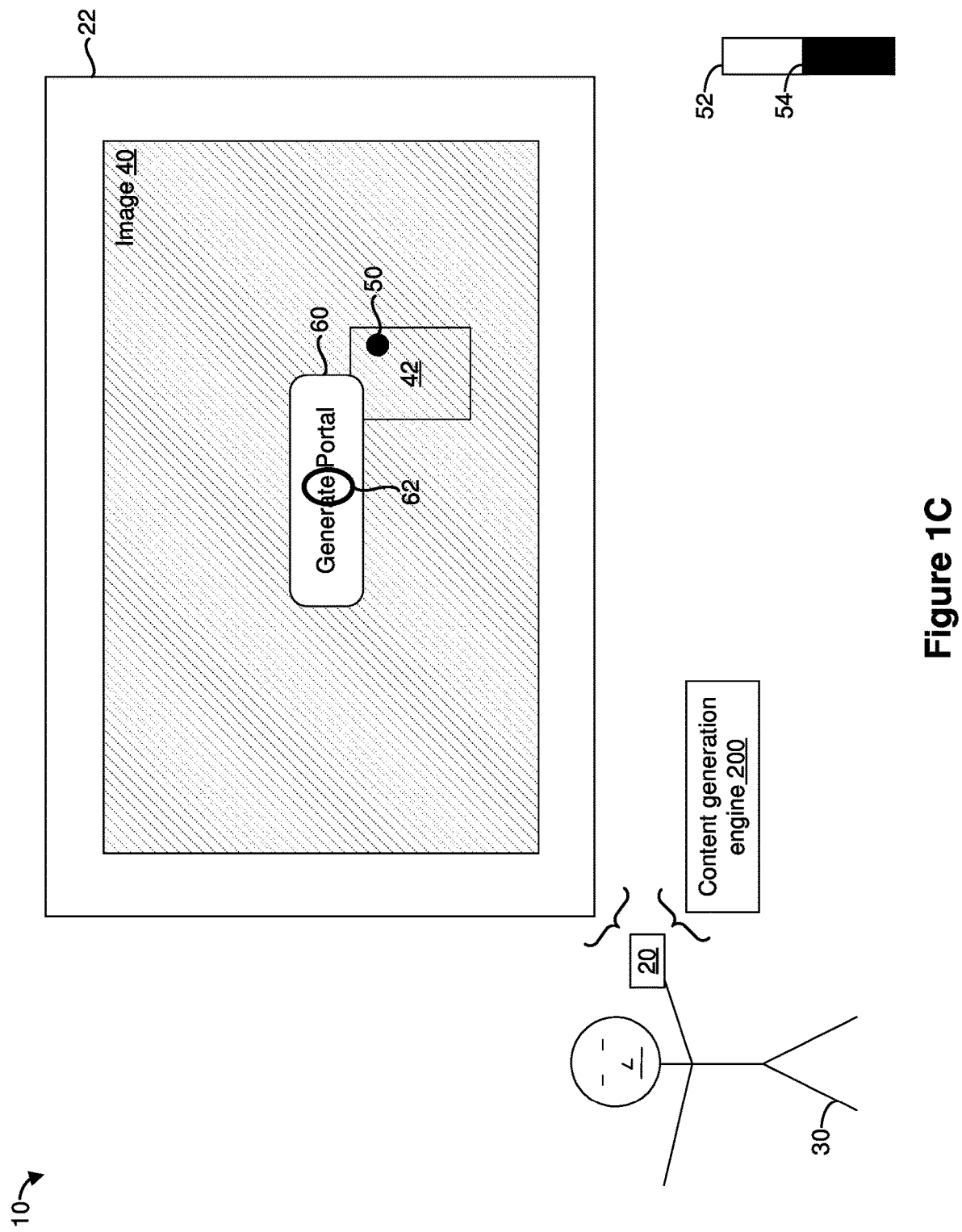

Referring to FIG. 1C, in some implementations, the content generation engine 200 displays a generate affordance 60. In some implementations, the generate affordance 60 provides the user 30 an option to confirm whether or not the user 30 wants to create an XR environment based on the image 40. As illustrated in FIG. 1C, in some implementations, the electronic device 20 detects a user input 62 directed to the generate affordance 60. In some implementations, the user input 62 corresponds to a request to generate an XR environment based on the image 40.

Figure 1D:
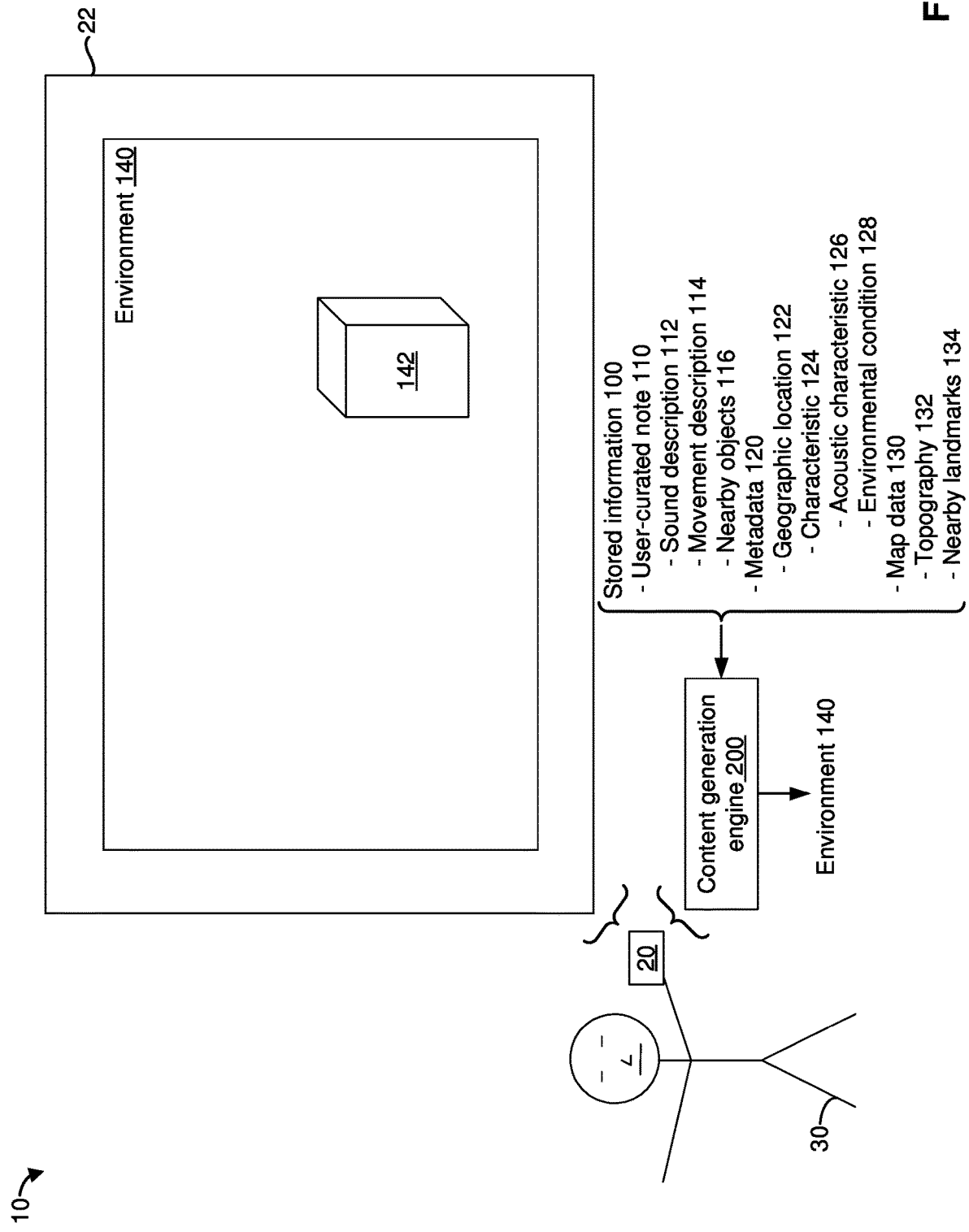

Referring to FIG. 1D, in various implementations, the electronic device 20 and/or the content generation engine 200 synthesize an XR environment 140 (e.g., a 3D computer-generated environment) based on the image 40 shown in FIGS. 1A-1C. As illustrated in FIG. 1D, the XR environment 140 includes an XR representation 142 of the subject (e.g., a 3D computer-generated representation of the subject, for example, a 3D virtual object that represents the subject). The XR representation 142 corresponds to the representation 42 in the image 40 shown in FIGS. 1A to 1C. In various implementations, the content generation engine 200 synthesizes the XR environment 140 based on stored information 100. In some implementations, the content generation engine 200 identifies a portion of the stored information 100 that relates to the image 40. For example, in some implementations, the content generation engine 200 identifies a portion of the stored information 100 that relates to (e.g., describes a characteristic of) the subject. In some implementations, the stored information 100 includes a user-curated note 110. In some implementations, the user-curated note 110 includes a sound description 112. For example, the sound description 112 specifies the sound that the subject was generating when the electronic device 20 captured the image 40. In some implementations, the user-curated note 110 includes a movement description 114. In some implementations, the movement description 114 describes a movement of the subject when the electronic device 20 captured the image 40. In some implementations, the user-curated note 110 indicates nearby objects 116 that were within a threshold distance of the subject when the electronic device 20 captured the image 40. For example, the nearby objects 116 indicates the presence of other objects that were not in a field-of-view of the electronic device 20 when the electronic device 20 captured the image 40.

In some implementations, the user-curated note 110 was created by the user 30. For example, the user 30 used a note-taking application (e.g., a notes application) to create the user-curated note 110. In some implementations, the user-curated note 110 includes text (e.g., typed text or handwritten text). In some implementations, the user-curated note 110 includes a graphic (e.g., an image or a hand-drawn sketch). In some implementations, the user-curated note 110 includes a link (e.g., a web address that provides more information regarding a subject). In some implementations, the user-curated note 110 includes audio. For example, in some implementations, the user 30 generated the user-curated note 110 by recording a voice clip (e.g., using a voice recording application).

In some implementations, the stored information 100 includes metadata 120 associated with the image 40. In some implementations, the metadata 120 indicates a geographic location 122 that is associated with the image 40. For example, in some implementations, the geographic location 122 indicates a location where the electronic device 20 captured the image 40. In some implementations, the metadata 120 indicates a characteristic 124 of the geographic location 122. In some implementations, the characteristic 124 is referred to as a location-based characteristic, for example, because the characteristic 124 is a function of the geographic location 122. In some implementations, the characteristic 124 includes an acoustic characteristic 126. In some implementations, the acoustic characteristic 126 indicates an ambient sound of the geographic location 122. In some implementations, the characteristic 124 indicates an environmental condition 128 associated with the geographic location 122. For example, in some implementations, the environmental condition 128 indicates that it was raining at the geographic location 122 when the electronic device 20 captured the image 40. As another example, the environmental condition 128 may indicate that it was snowing at the geographic location 122 when the electronic device 20 captured the image 40. In some implementations, the content generation engine 200 obtains the characteristic 124 from a remote datastore that stores historical data for various physical environments. For example, in some implementations, the content generation engine 200 retrieves the environmental condition 128 from a weather service that provides environmental conditions (e.g., temperature values, precipitation values, etc.).

In some implementations, the stored information 100 includes map data 130. In some implementations, the content generation engine 200 retrieves the map data 130 from a mapping application. In some implementations, the content generation engine 200 obtains the map data 130 from a map service. In some implementations, the map data 130 indicates a topography 132 of the physical environment in which the electronic device 20 captured the image 40. For example, in some implementations, the topography 132 indicates whether the ground was flat or hilly. In some implementations, the map data 130 indicates nearby landmarks 134. In some implementations, the nearby landmarks 134 are landmarks that are within a threshold distance of the geographic location 122 where the electronic device 20 captured the image 40. In some implementations, the nearby landmarks 134 include natural landmarks or human-made landmarks.

In some implementations, the stored information 100 is stored in association with one or more applications that are at least partially installed on the electronic device 20. For example, in some implementations, the stored information 100 (e.g., the user-curated note 110) is stored in a note application. In some implementations, the stored information 100 is stored in a calendar application (e.g., as information associated with a calendar event that the user 30 created). In some implementations, the stored information 100 is stored in a voice memo application (e.g., as a voice recording that the user 30 made describing a subject depicted in the image 40).

As will be described herein, in various implementations, the content generation engine 200 utilizes information provided by the user-curated note 110, the metadata 120 and/or the map data 130 to supplement the image 40 and synthesize the XR environment 140. As such, in various implementations, the XR environment 140 includes 3D objects that the content generation engine 200 generates based on the information provided by the user-curated note 110, the metadata 120 and/or the map data 130 even though the image 40 does not include corresponding 2D representations for the 3D objects.

Figure 1E:
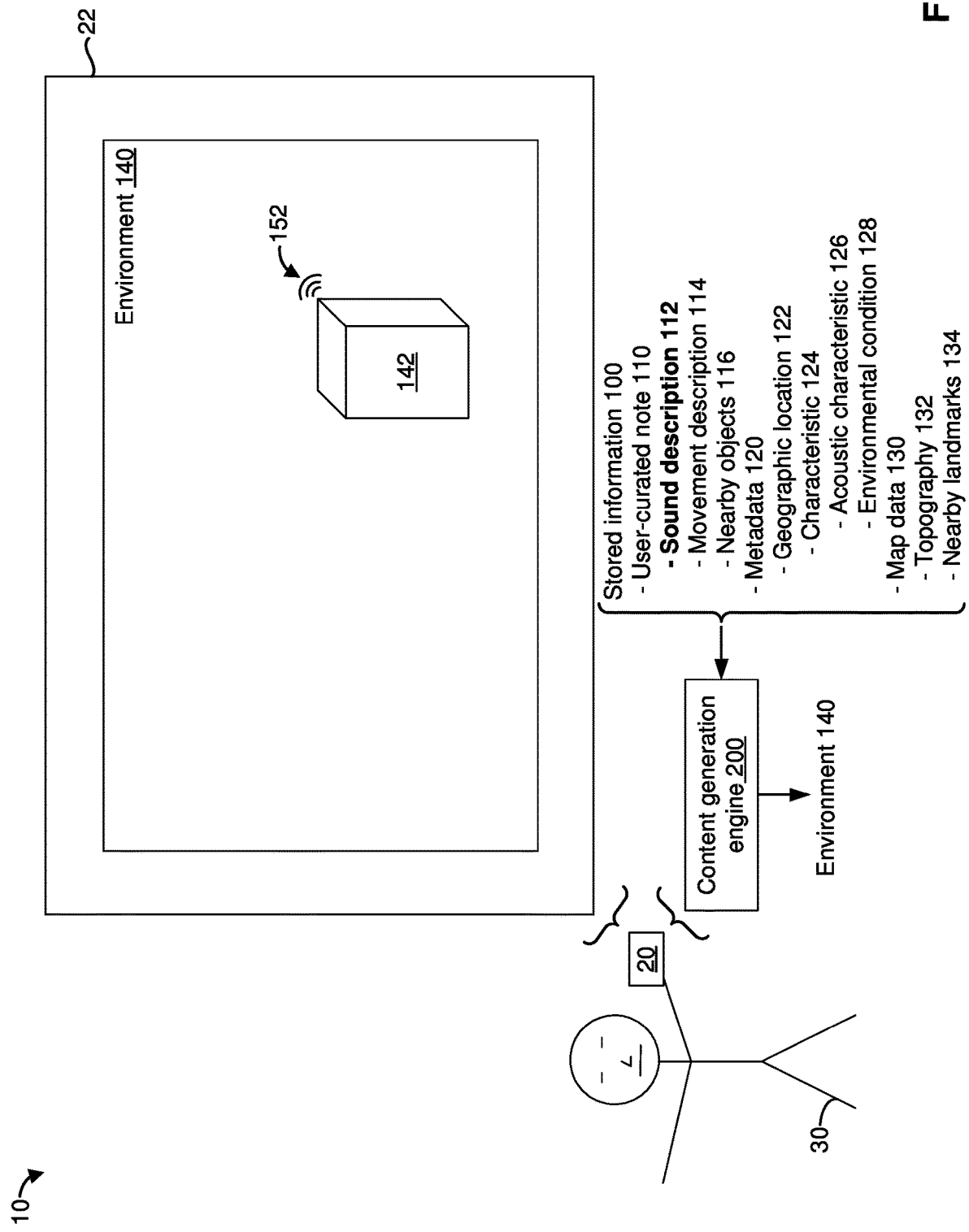

Referring to FIG. 1E, in some implementations, the content generation engine 200 synthesizes the XR environment 140 based on the image 40 and the sound description 112. As an example, the sound description 112 may describe a sound that the subject was making when the electronic device 20 captured the image 40. In the example of FIG. 1E, the content generation engine 200 associates a sound 152 with the XR representation 142 of the subject in order to provide an appearance that the XR representation of 142 is generating the sound 152. As such, when the user 30 views the XR environment 140 the user 30 is able to listen to the sound 152 that is within a similarity threshold of a sound that the subject was making when the electronic device 20 captured the image 40. In various implementations, incorporating the sound 152 into the XR environment 140 enhances the user experience of the electronic device 20 by allowing the user 30 to listen to the sound 152 that the user 30 would not be able to listen to if the user 30 was viewing the image 40. More generally, in various implementations, the content generation engine 200 generates the XR environment 140 such that the XR environment 140 includes sounds that corresponding images cannot include thereby enhancing a functionality of the electronic device 20 and improving a user experience provided by the electronic device 20. In some implementations, incorporating the sound 152 in the XR environment 140 reduces the need for user inputs corresponding to the user 30 searching for and playing sounds that match the sound description 112. Reducing unnecessary user inputs tends to reduce utilization of computing resources associated with interpreting and acting upon user inputs thereby reducing power consumption of the electronic device 20 and/or heat generation by the electronic device 20.

Figure 1F:
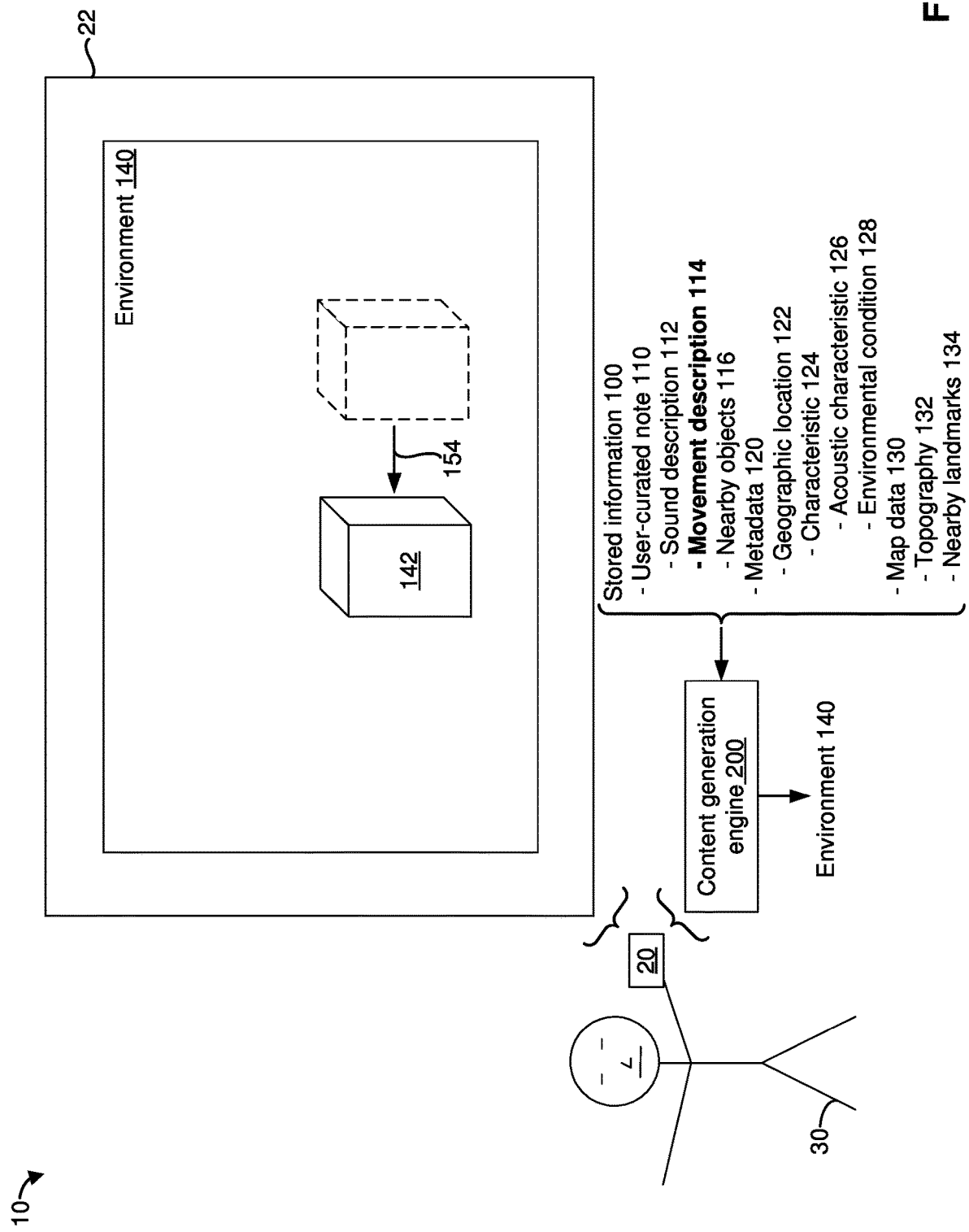

Referring to FIG. 1F, in some implementations, the content generation engine 200 generates the XR environment 140 based on the image 40 and the movement description 114 provided in a user-curated note 110 related to the image 40. As an example, the movement description 114 may indicate how the subject was moving when the electronic device 20 captured the image 40. For example, the user 30 may have described how the subject was moving by estimating a speed of the subject, by indicating a direction in which the subject was moving or specifying a path that the subject was traversing while the electronic device 20 was capturing the image 40. The content generation engine 200 displays a movement 154 of the XR representation 142 based on the movement description 114. In some implementations, the movement 154 is within a similarity threshold of a movement indicated by the movement description 114. For example, if the movement description 114 provides an estimate of the speed at which the subject was traveling when the electronic device 20 captured the image 40, the content generation engine 200 displays the movement 154 of the XR representation 142 at a speed that matches the estimated speed specified in the movement description 114. As another example, if the movement description 114 indicates a path that the subject was taking, or a type of movement of the subject when the electronic device 20 captured the image 40, the content generation engine 200 displays the movement 154 such that the movement 154 is within a similarity threshold of the type of movement indicated by the movement description 114. For example, if the movement description 114 indicates that the subject was moving back and forth, the content generation engine 200 displays the movement 154 such that the XR representation 142 is moving back and forth within the XR environment 140. In some implementations, displaying the movement 154 within the XR environment 140 reduces the need for user inputs corresponding to the user 30 searching for and playing videos that illustrate a movement that matches the movement description 114. Forgoing unnecessary playback of videos tends to conserve bandwidth (e.g., if the videos are being streamed by the electronic device 20).

Figure 1G:
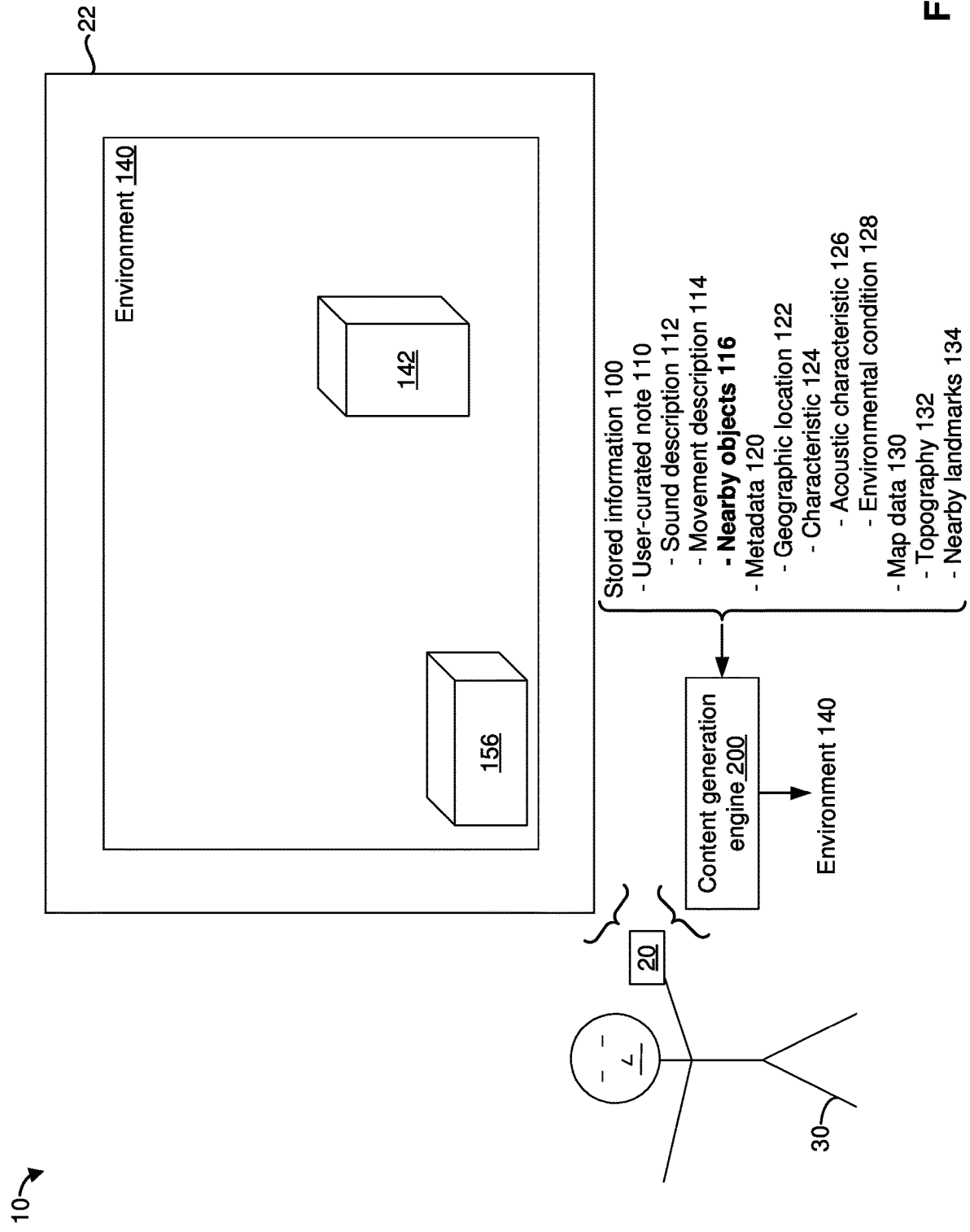

Referring to FIG. 1G, in some implementations, the user-curated note 110 indicates nearby objects 116. In some implementations, the user 30 may indicate objects that were near the subject, but were not in a field-of-view of the electronic device 20, and thus not represented in the image 40. In some implementations, the content generation engine 200 includes an XR representation 156 of another object indicated by the nearby objects 116. As such, in some implementations, the content generation engine 200 includes 3D objects in the XR environment 140 that may not be represented in the image 40. Being able to display representations of objects that were near the subject when the electronic device 20 captured the image 40 but are not represented in the image 40 allows the user 30 to have a more immersive experience into the physical environment where the image 40 was captured thereby improving a user experience provided by the electronic device 20. More generally, in various implementations, the content generation engine 200 generates the XR environment 140 such that the XR environment 140 includes a greater portion or represents a greater portion of the physical environment in which the image 40 was captured than what is represented in the image 40. In some implementations, the image 40 represents a first portion of the physical environment and the XR environment 140 represents a second portion of the physical environment that is different from (e.g., greater than) the first portion. Representing additional portions of the physical environment reduces the need for user inputs corresponding to the user 30 searching for images or videos that depict the additional portions.

Figure 1H:
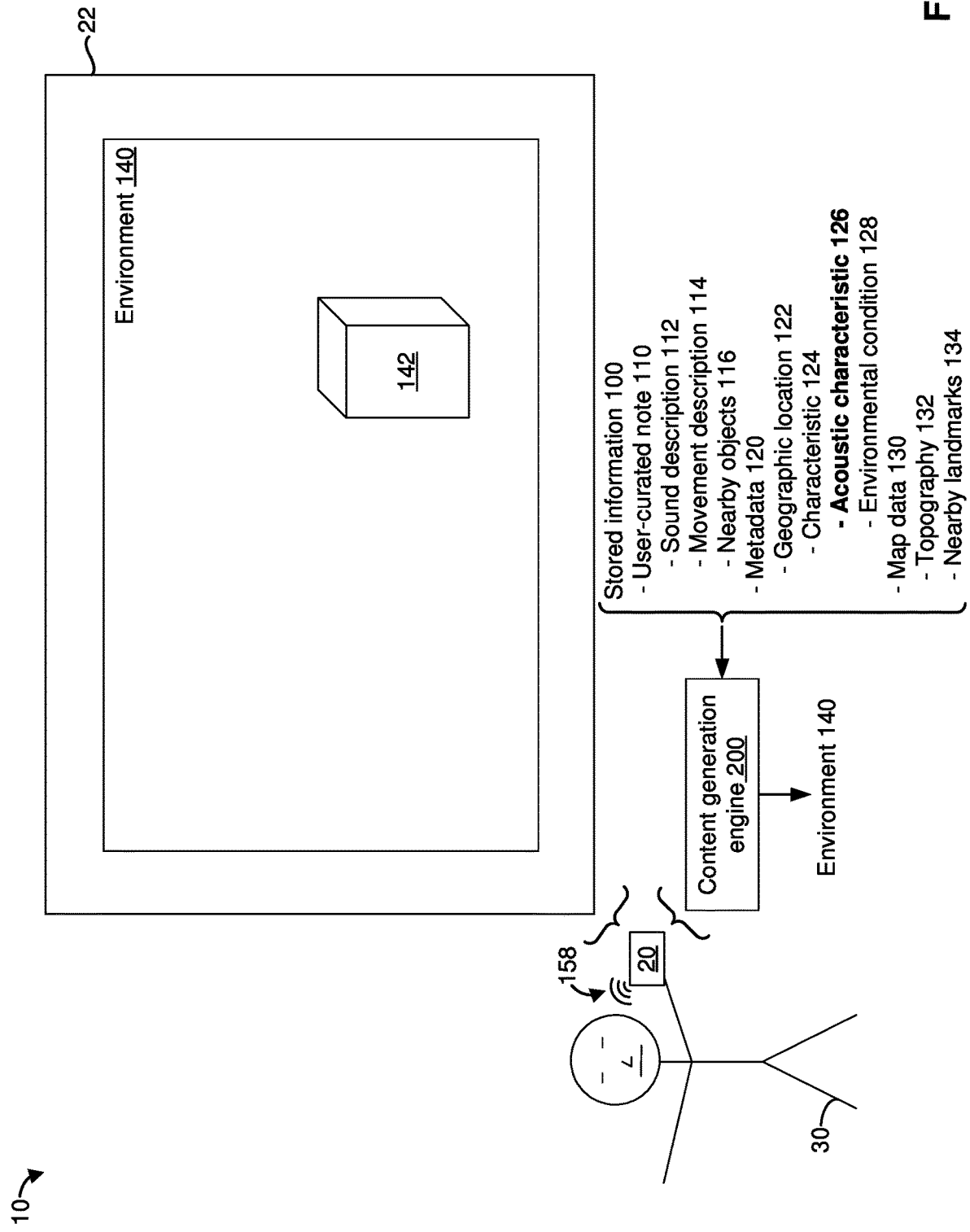

Referring to FIG. 1H, in some implementations, the content generation engine 200 utilizes the metadata 120 associated with the image 40 to generate the XR environment 140. In some implementations, the metadata 120 indicates a geographic location 122 where the electronic device 20 captured the image 40. In some implementations, the electronic device 20 obtains an acoustic characteristic 126 associated with the geographic location 122. For example, the electronic device 20 may obtain sounds that are usually audible at the geographic location 122. In some implementations, the content generation engine 200 retrieves an audio clip that the user 30 may have recorded at or near the geographic location 122. In some implementations, the acoustic characteristic 126 indicates an ambient sound at the geographic location 122. As an example, if the geographic location 122 is proximate to an ocean, the acoustic characteristic 126 may indicate the sound of ocean waves being audible at the geographic location 122. In this example, the content generation engine 200 generates the XR environment 140 such that the sound of ocean waves crashing is audible when the user 30 views the XR environment 140. More generally, in various implementations, the electronic device 20 outputs an environmental sound 158 based on the acoustic characteristic 126 associated with the geographic location 122. Playing the environmental sound 158 allows the user 30 to experience the physical environment in which the image 40 was captured to a greater degree than simply viewing the image 40 thereby enhancing the user experience provided by the electronic device 20. For example, listening to the environmental sound 158 while viewing the XR environment 140 results in a more immersive experience than viewing the image 40 by itself.

Referring to FIG. 1I, in some implementations, the content generation engine 200 obtains an environmental condition 128 associated with the geographic location 122. For example, in some implementations, the environmental condition 128 may indicate that it was raining at the geographic location 122 when the electronic device 20 captured the image 40. As another example, the environmental condition 128 may indicate that it is currently raining at the geographic location 122 where the electronic device 20 captured the image 40. In some implementations, the content generation engine 200 modifies the XR environment 140 such that the XR environment 140 includes virtual environmental conditions that mimic the environmental condition 128 of the geographic location 122. In the example of FIG. 1I, the content generation engine 200 displays virtual rain 160 within the XR environment 140 in order to mimic rain indicated by the environmental condition 128. In some implementations, the environmental condition 128 indicates current environmental conditions at the geographic location 122, and the electronic device 20 allows the user 30 to experience the geographic location 122 in its current form. In some implementations, the environmental condition 128 indicates historical environmental conditions at the geographic location 122, and the electronic device 20 allows the user 30 to experience the geographic location 122 as it was previously (e.g., when the electronic device 20 captured the image 40, or at some other time in the past).

Figure 1J:
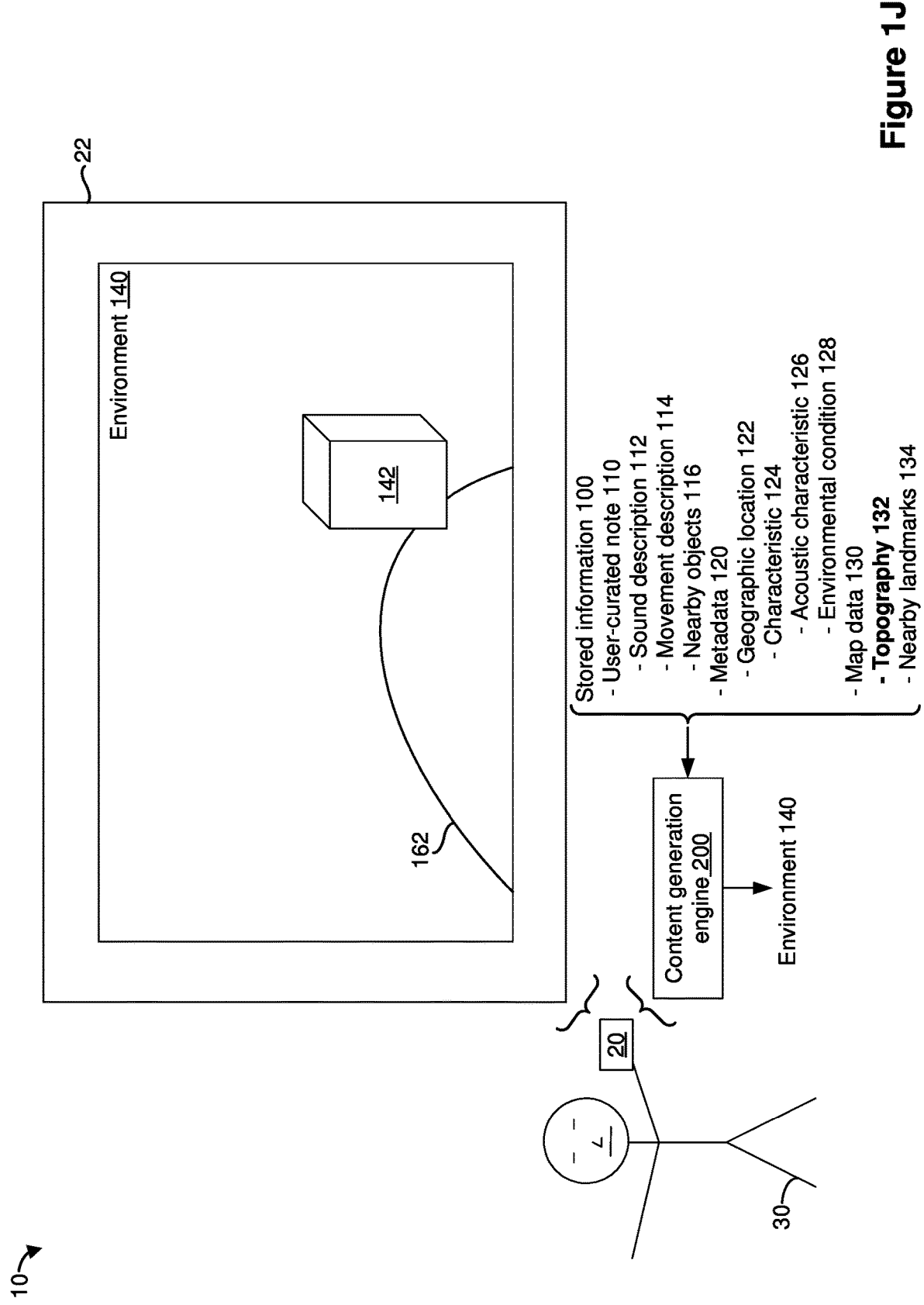

Referring to FIG. 1J, in some implementations, the map data 130 indicates a topography 132 of the geographic location 122. For example, in some implementations, the topography 132 indicates whether the geographic location is flat or hilly. More generally, in some implementations, the topography 132 indicates a terrain of the geographic location 122 where the electronic device 20 captured the image 40. In some implementations, the content generation engine 200 generates the XR environment 140 such that a virtual topography of the XR environment 140 is within a similarity threshold of the topography 132 of the geographic location 122 where the electronic device 20 captured the image 40. As an example, if the topography 132 indicates that the geographic location 122 is hilly, the content generation engine 200 displays a virtual hill 162 in the XR environment 140. More generally, in various implementations, the content generation engine 200 sets a virtual terrain of the XR environment 140 to mimic a physical terrain of the physical environment where the image 40 was captured even though the image 40 may not depict the physical terrain.

Figure 1K:
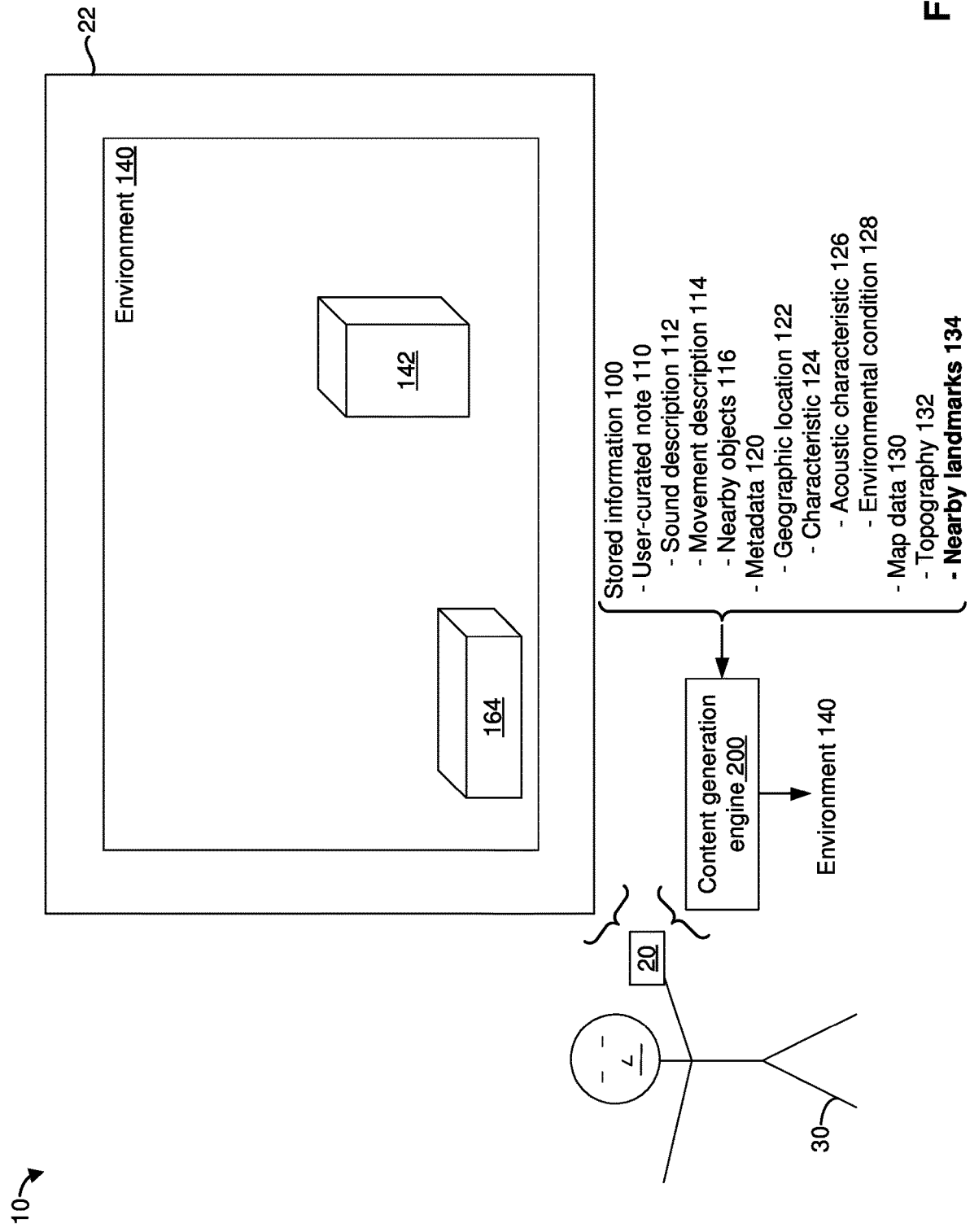

Referring to FIG. 1K, in some implementations, the map data 130 indicates nearby landmarks 134. In some implementations, the nearby landmarks 134 include natural landmarks. In some implementations, the nearby landmarks 134 include human-made landmarks. For example, in some implementations, the nearby landmarks 134 indicate monuments that are within a threshold distance of the subject depicted in the image 40. In some implementations, the content generation engine 200 displays XR representations of the landmarks in the XR environment 140. In the example of FIG. 1K, the content generation engine 200 displays an XR representation 164 of a landmark based on the nearby landmarks 134 indicated by the map data 130.

Figure 1L:
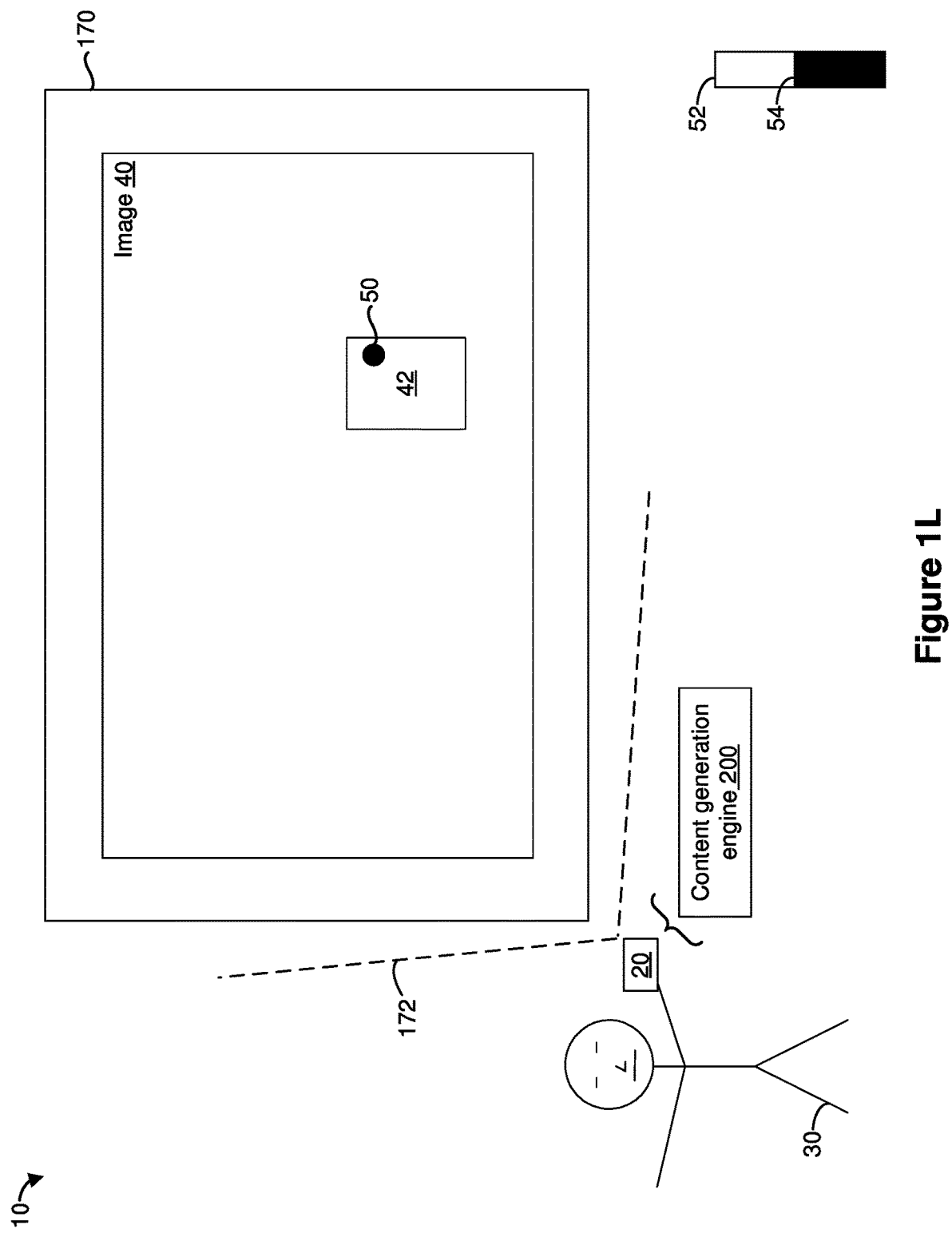

Referring to FIG. 1L, in some implementations, the user 30 is looking at a picture frame 170 that is in a field-of-view 172 of the electronic device 20. In the example of FIG. 1L, the image 40 is a physical image that is integrated into (e.g., supported by, for example, mounted on) the picture frame 170. As such, in various implementations, the content generation engine 200 allows the user 30 to generate an XR environment based on physical pictures. For example, in response to detecting the gaze 50 for the amount of time 52 that is greater than the threshold time 54, the content generation engine 200 can display the generate affordance 60 by overlaying the generate affordance 60 onto the picture frame 170. For example, the content generation engine 200 can display the generate affordance 60 as an AR affordance that is overlaid onto the picture frame 170.

Figure 1M:
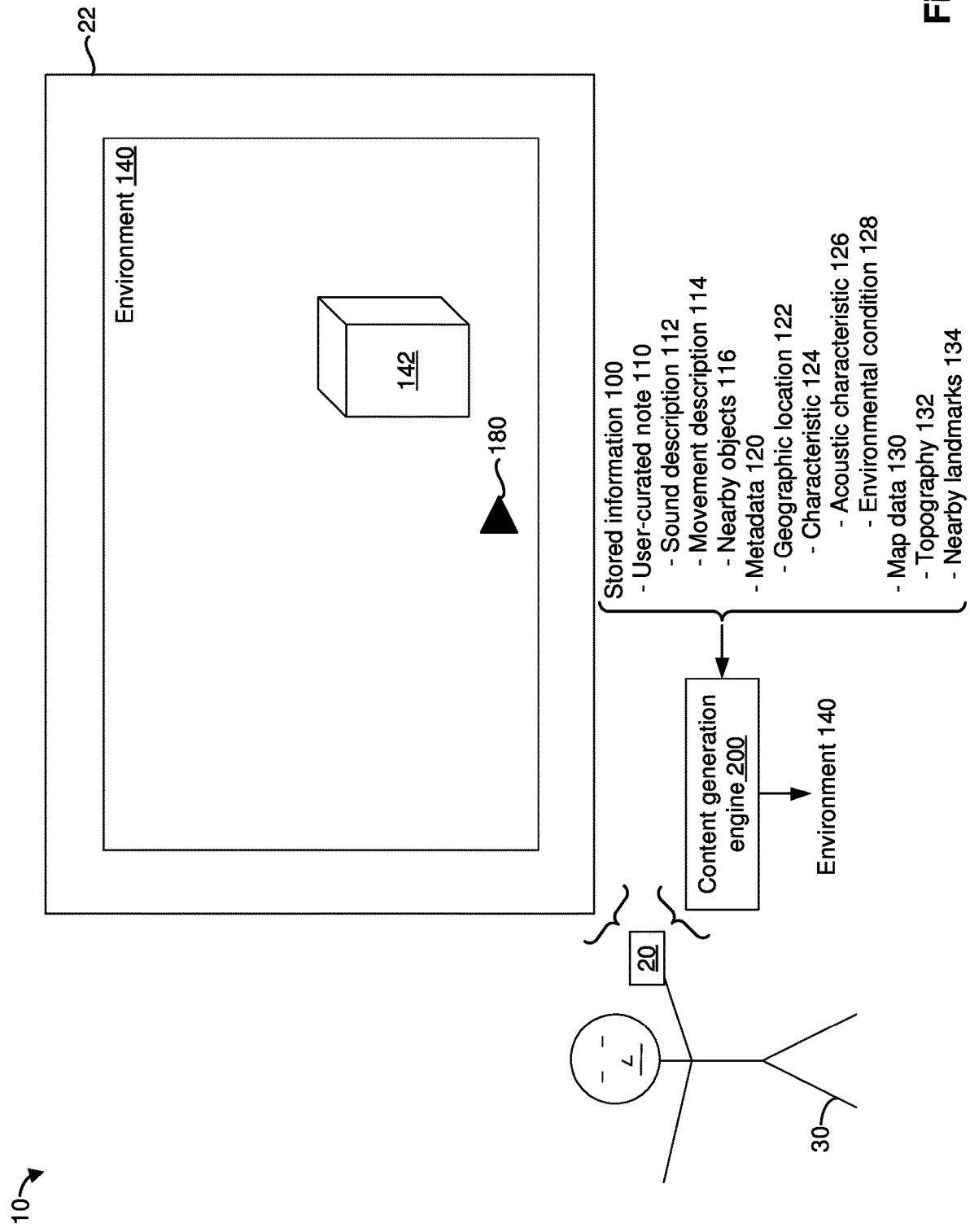
Figure 1N:
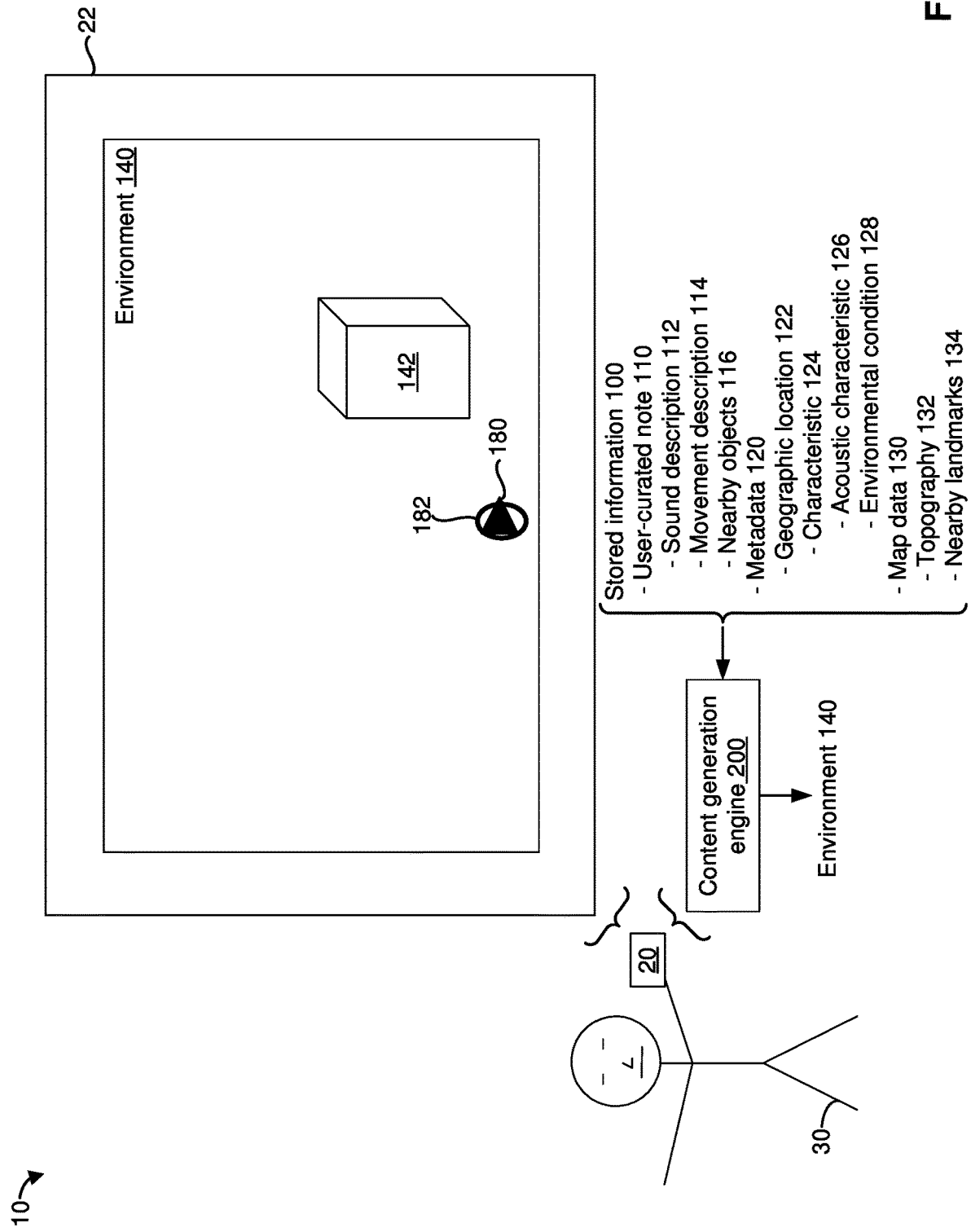
Figure 1O:
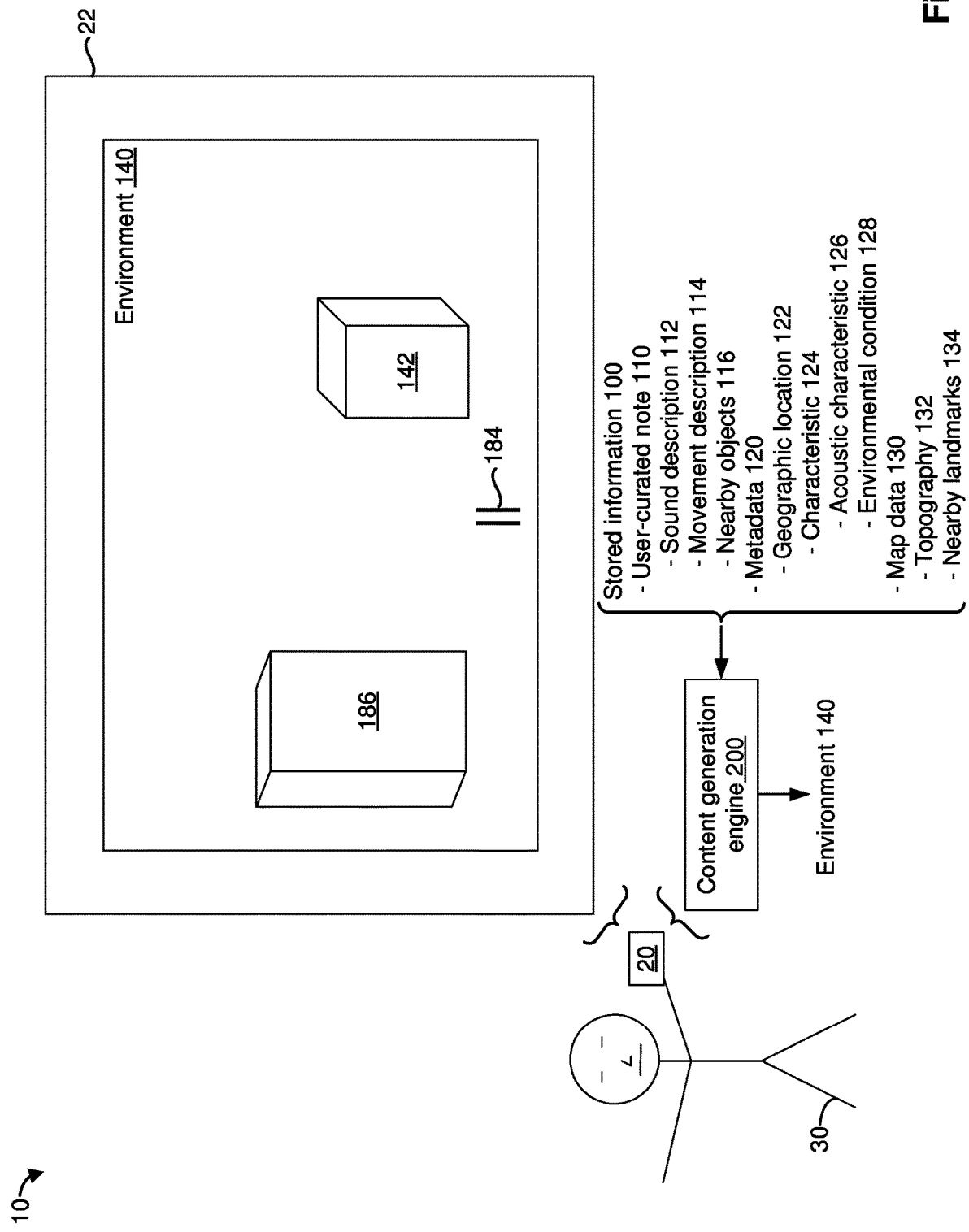

FIGS. 1M-1O illustrate a sequence in which the XR environment 140 displays a change in the physical environment where the image 40 was captured over a period of time. Referring to FIG. 1M, in some implementations, the XR environment 140 includes a play affordance 180. In various implementations, the play affordance 180 allows the user 30 to view the XR environment 140, representing the physical environment where the image 40 was captured, over a period of time. As such, the XR environment 140 allows the user 30 to see how the physical environment changes over a period of time.

Referring to FIG. 1N, the electronic device 20 detects a user input 182 directed to the play affordance 180. For example, the electronic device 20 detects a contact (e.g., a tap) at a location corresponding to the play affordance 180. Referring to FIG. 1O, in response to detecting the user input 182 shown in FIG. 1N, the electronic device 20 and/or the content generation engine 200 advance a playback of the XR environment 140 such that the XR environment 140 illustrates a change in the physical environment, where the image 40 was captured, over a period of time.

In some implementations, the XR environment 140 shows how the physical environment has changed after the image 40 was captured. Alternatively, in some implementations, the XR environment 140 shows how the physical environment changed before the image 40 was captured. In the example of FIG. 1O, the XR environment 140 includes a pause affordance 184 for pausing the experience and an XR object 186 that represents a new physical object that was at the physical environment at a different time. In other words, while the new physical object was not in the physical environment when the image 40 was captured, the new physical object was in the physical environment at a time corresponding to FIG. 1O. For example, the new physical object may have appeared after the image 40 was captured. As an example, the new physical object may represent a building that was constructed after the image 40 was captured. As another example, if FIG. 1O corresponds to a time before the image 40 was captured, the new physical object may represent an object that was present before the image 40 was captured but was not present in the physical environment when the image 40 was captured. For example, the XR object 186 may represent a building that existed prior to the image 40 being captured. However, the building may have been destroyed by the time the image 40 was captured. In various implementations, the XR environment 140 allows the user 30 to see how the physical environment has changed over a period of time. In some implementations, the XR environment 140 displays objects that were present at the physical environment at different times including objects that are not depicted in the image 40.

In some implementations, the electronic device 20 includes an HMD that is worn by the user 30. In some implementations, the HMD presents (e.g., displays) the XR environment 140 according to various implementations. In some implementations, the HMD includes an integrated display (e.g., a built-in display, for example, a built-in optical see-through display or a built-in opaque display) that displays the XR environment 140. In some implementations, the HMD includes a head-mountable enclosure. In various implementations, the head-mountable enclosure includes an attachment region to which another device with a display can be attached. For example, in some implementations, an electronic watch, a smartphone or a tablet can be attached to the head-mountable enclosure. In various implementations, the head-mountable enclosure is shaped to form a receptacle for receiving another device that includes a display (e.g., an electronic watch, a smartphone or a tablet). For example, in some implementations, a device with a display slides/snaps into or otherwise attaches to the head-mountable enclosure. In some implementations, the display of the device attached to the head-mountable enclosure presents (e.g., displays) the XR environment 140. In various implementations, examples of the electronic device 20 include smartphones, tablets, media players, laptops, etc.

Figure 2:
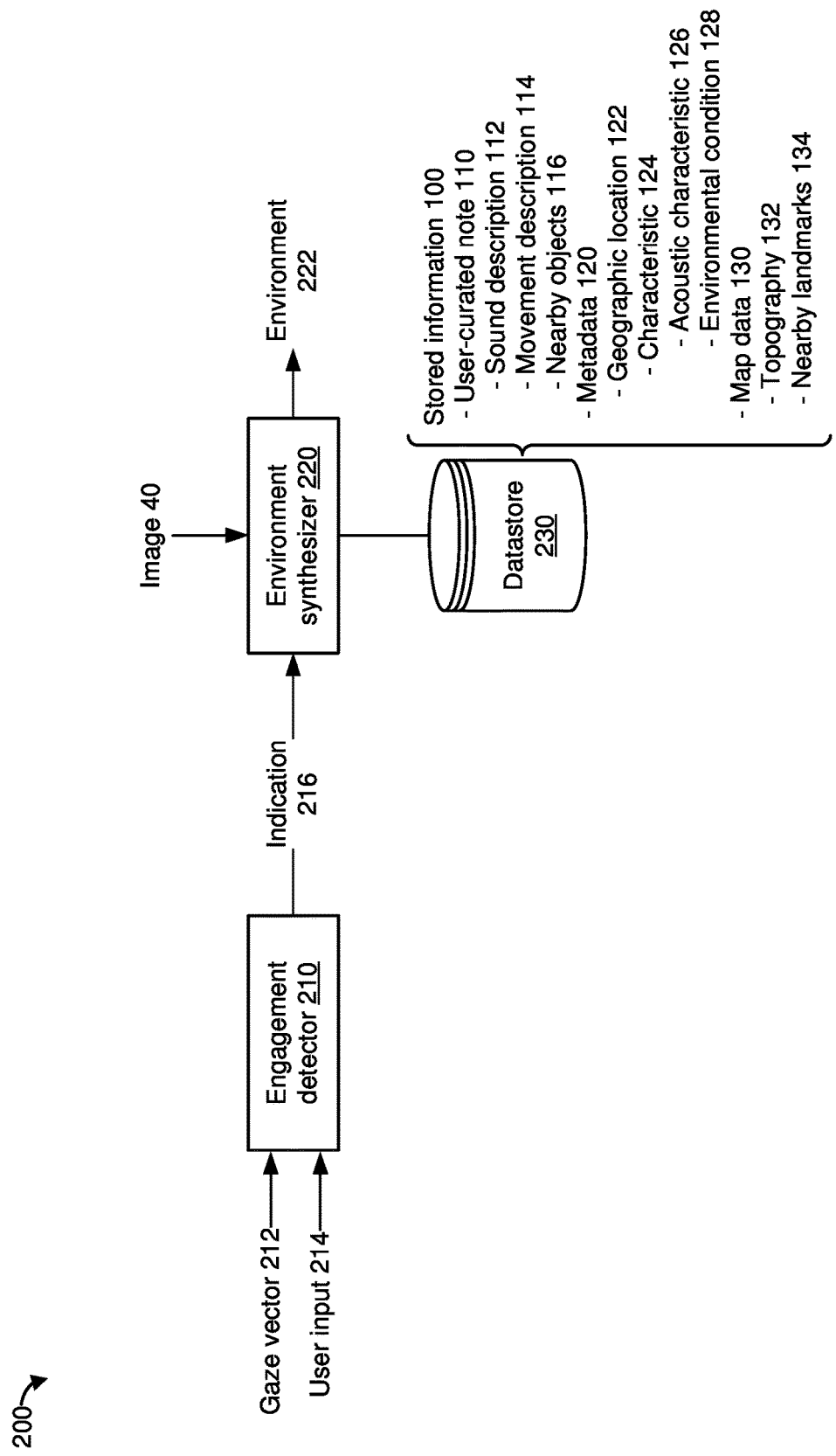
FIG. 2 is a block diagram of a content generation engine in accordance with some implementations.

FIG. 2 is a block diagram of the content generation engine 200 in accordance with some implementations. In some implementations, the content generation engine 200 resides at (e.g., is implemented by) the electronic device 20 shown in FIGS. 1A-1O. In some implementations, the electronic device 20 (shown in FIGS. 1A-1O) includes the content generation engine 200. In various implementations, the content generation engine 200 includes an engagement detector 210, an environment synthesizer 220 and a datastore 230 that stores the stored information 100.

In some implementations, the engagement detector 210 determines an engagement score that characterizes the level of engagement between a user and the representation of a subject included in an image. In some implementations, the engagement detector 210 obtains a gaze vector 212. For example, the engagement detector 210 detects the gaze 50 shown in FIG. 1B. In some implementations, the engagement detector 210 detects a user input 214. In some implementations, the gaze vector 212 indicates that a gaze of a person is directed to the subject in the image. In some implementations, if the gaze vector 212 indicates that a gaze is directed to the subject included in the image, the engagement detector 210 determines that the user wants to create an XR environment that is based on the image.

In some implementations, the user input 214 includes a selection of an image. For example, in some implementations, the user can browse through an image library and select one of the images in the library. In some implementations, if the engagement score satisfies (e.g., exceeds) the threshold engagement score, the engagement detector 210 provides an indication 216 to the environment synthesizer 220 to generate an XR environment 222 based on the image 40. For example, in some implementations, if the gaze vector 212 indicates that a gaze is directed to the subject in the image 40 for a threshold amount of time, the engagement detector 210 determines that the engagement score satisfies the engagement threshold and the engagement detector 210 provides the indication 216 to the environment synthesizer 220. In some implementations, the user input 214 includes a voice input. For example, the user may utter an utterance that identifies a subject in the image or the user may provide a voice command to generate an XR environment (e.g., "create a virtual environment", "create a portal", etc.).

In various implementations, the environment synthesizer 220 synthesizes the XR environment 222 (e.g., the XR environment 140 shown in FIGS. 1D-1K and 1M-1O) based on the image 40 and the stored information 100. In some implementations, the environment synthesizer 220 includes XR objects in the XR environment 222 based on the stored information 100. In some implementations, the environment synthesizer 220 incorporates sounds into the XR environment 222 based on the sound description 112. For example, in some implementations, the environment synthesizer 220 includes a sound that matches the sound description 112 in order to provide an appearance that the sound is being generated by an XR object in the XR environment 222.

In some implementations, the environment synthesizer 220 displays a movement of an XR object in the XR environment 222 based on the movement description 114. For example, in some implementations, the environment synthesizer 220 causes an XR object in the XR environment 222 to move in a manner similar to a movement indicated by the movement description 114. As such, while the image 40 may not display a movement of the representation of the subject, the XR environment 222 displays a movement of an XR representation of the subject thereby providing an enhanced user experience.

In some implementations, the environment synthesizer 220 displays XR objects that are not depicted in the image 40 based on the nearby objects 116 indicated in the user-curated note 110. In some implementations, the image 40 does not include representations of objects that are outside the field-of-view of the electronic device 20 when the electronic device 20 captured the image 40. However, the environment synthesizer 220 includes XR representations of objects that were outside the field-of-view of the electronic device 20 when the electronic device 20 captured the image 40 in order to provide a more immersive experience of the physical environment where the image 40 was captured. Providing a more immersive experience than displaying the image 40 alone enhances functionality of the device.

In various implementations, the environment synthesizer 220 uses the metadata 120 associated with the image 40 to generate the XR environment 222. In some implementations, the metadata 120 indicates the geographic location 122 where the image 40 was captured. In such implementations, the environment synthesizer 220 includes features of the geographic location 122 in the XR environment 222 even though the features are not depicted in the image 40. As an example, in some implementations, the geographic location 122 is associated with an acoustic characteristic 126. In such implementations, the environment synthesizer 220 incorporates sounds in the XR environment 222 that match the acoustic characteristic 126. As such, although the image 40 does not include any sounds, the XR environment 222 corresponding to the image 40 includes sounds thereby enhancing a user experience provided by the content generation engine 200. As another example, the environment synthesizer 220 includes or sets virtual conditions of the XR environment 222 based on the environmental condition 128 associated with the geographic location 122. As such, although the image 40 may not indicate the environmental condition 128, the XR environment 222 indicates the environmental condition 128 thereby enhancing a user experience provided by the content generation engine 200.

In some implementations, the environment synthesizer 220 synthesizes the XR environment 222 based on the map data 130. For example, in some implementations, the environment synthesizer 220 synthesizes the XR environment 222 based on the topography 132 indicated by the map data 130. In some implementations, the topography may indicate a terrain of the physical environment where the image 40 was captured. In such implementations, the environment synthesizer 220 sets a virtual terrain of the XR environment 222 to match the terrain indicated by the topography 132. As such, even though the image 40 may not depict the terrain of the physical environment, the XR environment 222 indicates the terrain of the physical environment thereby enhancing the user experience provided by the content generation engine 200 by making the XR environment 222 more stimulating than the image 40 alone. In some implementations, the map data 130 indicates nearby landmarks 134. In some implementations, the environment synthesizer 220 includes XR representations of nearby landmarks 134 in the XR environment 222 even though the image 40 does not include representations of the nearby landmarks 134. As such, the XR environment 222 allows the user 30 to explore the nearby landmarks 134 via the XR environment 222 even though the nearby landmarks 134 are not depicted in the image 40 thereby enhancing a user experience provided by the content generation engine 200.

FIG. 3 is a flowchart representation of a method 300 of synthesizing a 3D computer-generated environment (e.g., an XR environment) based on an image and stored information associated with the image. In various implementations, the method 300 is performed by a device with a non-transitory memory and one or more processors coupled with the non-transitory memory (e.g., the electronic device 20 shown in FIGS. 1A-1O, and/or the content generation engine 200 shown in FIGS. 1A-2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes determining an engagement score that characterizes a level of engagement between a user and a representation of a subject included in an image. In some implementations, the method 300 includes detecting that a gaze of the user is directed to the subject in the image for an amount of time that exceeds a threshold time. For example, as shown in FIG. 1B, the electronic device 20 detects that the gaze 50 is directed to the representation 42 of the subject for the amount of time 52 that is greater than the threshold time 54. In some implementations, the engagement score is an amount of time for which the user has been gazing at the subject in the image.

As represented by block 310a, in some implementations, the subject includes an object represented in the image. In some implementations, the object is a physical article, for example, a tangible object such as a boat, a motorcycle, etc. In some implementations, the object is a recognizable landmark such as the Eiffel Tower. In some implementations, the object is a virtual object, for example, a graphical object (e.g., a computer-generated object, for example, an AR object).

As represented by block 310b, in some implementations, the subject includes environmental conditions represented in the image. For example, in some implementations, the image depicts rain or snow and the subject is the rain or the snow depicted in the image. For example, in some implementations, the user 30 may be gazing at the rain or the snow in the image 40, for example, instead of gazing at a representation of a physical object depicted in the image.

As represented by block 310c, in some implementations, the subject includes a physical environment represented in the image. In some implementations, the user 30 may be gazing at the image as a whole, for example, instead of gazing at a particular subject depicted in the image. As an example, if the image is of Central Park in New York City and the image depicts various people and trees that are in Central Park, the user 30 may be gazing at the entire image as a whole, for example, instead of gazing at a particular person or a particular tree depicted in the image.

As represented by block 310d, in some implementations, the method 300 includes detecting a user selection of the image in an application. For example, in some implementations, the image is a photo that is stored in association with a photo application. In some implementation, the photo application may include numerous photos and the user 30 may have selected a particular photo from the various photos in the photo application. In some implementations, selection of a particular photo represents a request to generate an XR environment based on the photo.

As represented by block 310e, in some implementations, the method 300 includes detecting that the user is viewing a physical picture frame. In some implementations, the picture is supported by (e.g., mounted on or affixed to) a physical picture frame and the device detects that the user is gazing at a portion of the picture frame or the entire picture frame. For example, as shown in FIG. 1L, the electronic device 20 detects that the user 30 is gazing at the picture frame 170.

As represented by block 320, in some implementations, the method 300 includes, in response to the engagement score satisfying an engagement threshold, obtaining stored information regarding a subject, and synthesizing an extended reality (XR) environment based on the image and the stored information regarding the subject. For example, as shown in FIG. 1D, the content generation engine 200 generates the XR environment 140 based on the image 40 and the stored information 100 in response to the user 30 gazing at the representation 42 of the subject for the amount of time 52 that is greater than the threshold time 54. In various implementations, generating the XR environment based on the stored information allows the electronic device to include additional information in the XR environment that cannot be inferred from the image itself. As such, in various implementations, using the stored information allows the electronic device to generate an XR environment that is more stimulating than viewing the image. Hence, generating the XR environment improves a user experience provided by the device. In some implementations, incorporating the stored information into the XR environment reduces the need for a sequence of user inputs corresponding to searching for the stored information thereby enhancing operability of the device by reducing resource utilization associated with interpreting and acting upon the sequence of user inputs.

As represented by block 320a, in some implementations, obtaining the stored information includes accessing a user-curated note regarding the subject. In some implementations, the user-curated note specifies a characteristic of a subject that is not depicted in the image. In some implementations, synthesizing the XR environment includes generating an XR representation of the subject based on the representation of the subject included in the image and the characteristic of the subject specified in the user-curated note. In some implementations, the user-curated note describes a sound that the subject was generating when the device captured the image and synthesizing the XR environment includes associating the sound with the XR representation of the subject in order to provide an appearance that the XR representation of the subject is generating the sound. For example, as shown in FIG. 1E, the content generation engine 200 associates the sound 152 with the XR representation 142 of the subject in order to provide an appearance that the XR representation 142 of the subject is generating the sound 152 that is within a similarity threshold of a sound indicated by the sound description 112. As another example, if the subject is a motorcycle, the XR environment includes the rumbling of a motorcycle's engine. In some implementations, incorporating the sound into the XR environment reduces the need for a sequence of user inputs corresponding to searching for and playing sounds that are generated by the subject thereby enhancing operability of the device by reducing resource utilization associated with playing various sounds.

In some implementations, the user-curated note describes a movement of the subject when the device captured the image and synthesizing the XR environment includes animating the XR representation of the subject in accordance with the movement described in the user-curated note in order to provide an appearance that the XR representation of the subject is moving in accordance with the movement described in the user-curated note. For example, as shown in FIG. 1F, the content generation engine 200 displays a movement 154 of the XR representation 142 based on the movement description 114. In various implementations, incorporating the movement or animating the XR representation of the subject in accordance with the movement enhances a user experience of the device by providing a more immersive experience than viewing a static image with no animation. In some implementations, incorporating the movement into the XR environment reduces the need for a sequence of user inputs corresponding to searching for and playing videos that illustrate the movement of the subject thereby enhancing operability of the device by reducing resource utilization associated with playing various videos.

In some implementations, the user-curated note indicates that an object not depicted in the image was within a threshold distance of the subject when the device captured the image. In such implementations, synthesizing the XR environment includes placing an XR representation of the object within the threshold distance of an XR representation of the subject. As an example, in FIG. 1G, the content generation engine 200 displays the XR representation 156 of another object that is not depicted in the image 40. Displaying representations of objects that were outside a field-of-view of the electronic device 20 when the electronic device captured the image 40 enhances the user experience of the device by allowing the user to experience the XR environment in a more immersive manner.

In some implementations, the user-curated note indicates a size of the subject and synthesizing the XR environment includes generating an XR representation of the subject with a virtual dimension that is based on the size indicated by the user-curated note. In some implementations, the image may not be to scale. In such implementations, scaling the XR environment or the XR representation of the subject within the XR environment based on the size specified in the user-curated note may provide an XR environment that is representative of the physical environment in which the electronic device captured the image.

As represented by block 320b, in some implementations, obtaining the stored information includes obtaining metadata associated with the image, and synthesizing the XR environment includes synthesizing the XR environment based on a plurality of pixels in the image and the metadata associated with the image. For example, as shown in FIG. 1H, the metadata 120 may indicate a geographic location 122 of the electronic device 20 when the electronic device 20 captured the image 40. In this example, the content generation engine 200 incorporates a characteristic 124 of the geographic location 122 into the XR environment 140 in order to provide a more stimulating experience.

As represented by block 320c, in some implementations, obtaining the stored information includes identifying a geographic location of the device when the device captures the image, and synthesizing the XR environment includes determining a characteristic of the geographic location and representing the characteristic of the geographic location in the XR environment. For example, in some implementations, the characteristic is an acoustic characteristic that indicates an ambient sound of the geographic location, and synthesizing the XR environment includes integrating the ambient sound in the XR environment. As illustrated in FIG. 1H, the content generation engine 200 generates the XR environment 140 based on the acoustic characteristic 126 associated with the geographic location 122. Playing the ambient sound associated with the geographic location within the XR environment provides a more immersive experience than viewing a static image without the ambient sound associated with the environment thereby enhancing a user experience of the device.

In some implementations, the characteristic is an environmental characteristic that indicates an environmental condition of the geographic location, and synthesizing the XR environment includes synthesizing the XR environment with the virtual environmental condition that matches the environmental condition of the geographic location. For example, as shown in FIG. 1I, the content generation engine 200 displays virtual rain 160 within the XR environment 140 in response to the environmental condition 128 indicating that it was raining at the geographic location 122 when the image 40 was captured or it is currently raining at the geographic location 122 where the electronic device captured the image 40. In some implementations, displaying the virtual environmental conditions allows a user to experience the environmental conditions of the physical environment that may not have been depicted in the image thereby enhancing a user experience of the device.

As represented by block 320d, in some implementations, the stored information includes map data that indicates a topography of the geographic location where the device captured the image, and synthesizing the XR environment includes synthesizing the XR environment with a virtual topography that matches the topography of the geographic location. For example, as shown in FIG. 1J, the content generation engine 200 displays a virtual hill 162 within the XR environment 140 in response to the topography 132 indicating that there is a physical hill at the geographic location 122 where the electronic device 20 captured the image 40. In some implementations, displaying the virtual topography provides an indication of the physical topography of the geographic location where the image was captured even though the image does not indicate the geographic topography thereby allowing the user to experience the topography.

As represented by block 320e, in some implementations, the stored information is private information. For example, in some implementations, the stored information is stored on the device. In some implementations, the method 300 includes obtaining the stored information from the non-transitory memory. In some implementations, the stored information is publicly-available information. For example, in some implementations, the stored information includes publicly-available images of the subject. For example, in some implementations, the stored information includes images gathered by driving through the physical environment, or crowd-sourced images (e.g., pictures taken by other people and posted on a social network).

As represented by block 320f, in some implementations, the stored information includes an audio associated with the physical environment. In some implementations, the method 300 includes retrieving the audio from a sound library that stores audio files associated with various physical environments. In some implementations, the method 300 includes obtaining the audio from a microphone that is at the physical environment where the image was captured. In some implementations, the method 300 includes retrieving a sound clip that the device captured at the geographic location where the image was captured.

As represented by block 320g, in some implementations, the image includes a representation of a first portion of a physical environment, and the XR environment includes representations of the first portion and a second portion of the physical environment that is not represented in the image. For example, the XR environment shows objects that are outside a frame of the image. As an example, in FIG. 1G, the content generation engine 200 shows an XR representation 156 of an object that is not depicted in the image 40 but is indicated by the nearby objects 116. In some implementations, the second portion is adjacent to the first portion. For example, in some implementations, the XR environment shows objects that are adjacent to edges of the frame of the image.

As represented by block 320h, in some implementations, the image includes a representation of a physical environment at a first time, and the XR environment includes a representation of the physical environment at a second time that is different from the first time. For example, if the image was captured in 2010, the XR environment may indicate how the physical environment looks in 2020. As an example, in FIG. 1O, the content generation engine 200 displays how the physical environment corresponding to the image 40 looks at a time that is different from the time when the image 40 was captured. For example, as shown in FIG. 1O, the XR environment 140 includes the XR object 186 representing the new object whereas the image 40 does not include a 2D representation of the new object.

In some implementations, the XR environment includes XR representations of a first set of elements (e.g., physical articles) that were in the physical environment at a first time, and XR representations of a second set of elements that were in the physical environment at a second time. For example, the XR environment may include XR representations of elements that were in the physical environment in 2010 when the image was captured, and XR representations of elements that were in the physical environment in 2020, which is 10 years after the image was captured. For example, in FIG. 1O, the XR environment 140 includes the XR representations 142 and 186, whereas the image 40 includes a representation 42 that corresponds to the XR representation 142 but the image 40 does not include a representation that corresponds to the XR object 186.

In some implementations, the XR environment indicates a transition in the physical environment between the first time and the second time. For example, in some implementations, the XR environment illustrates how the physical environment corresponding to the image has changed over the period of time. For example, as shown in FIG. 1M, the XR environment 140 includes the play affordance 180 that allows the user to view the XR environment 140 at different times.

In some implementations, the method 300 includes generating intermediary content that corresponds to the transition. In some implementations, the method 300 includes interpolating between a first visual representation of the physical environment indicated by the image, and a second visual representation of the physical environment indicated by environmental data. As an example, the user may provide the content generation engine 200 with an image that was captured in 2010 and with depth data that was captured in 2020, and the content generation engine 200 may interpolate between the image captured in 2010 and the depth data captured in 2020 to determine how the physical environment changed between the years 2010 and 2020.

In some implementations, the method 300 includes generating the intermediary content based on images of the physical environment from intermediary times between the first time and the second time. For example, in some implementations, the device may obtain images of the physical environment at different times and play the images sequentially in order to illustrate the change in the physical environment over a period of time spanning the images.

In some implementations, the method 300 includes detecting that the device has captured a new image. For example, detecting that the device has captured a new photo. In some implementations, the method 300 includes prompting the user to provide additional information that the device can use to synthesize a 3D XR environment based on the new image and the additional information that the user provides. For example, in some implementations, the method 300 includes prompting the user to provide a brief description of what the new image represents, nearby objects that are not represented in the new image, movement of objects represented in the image, etc. In some implementations, the method 300 includes receiving a user input (e.g., text or speech) in response to prompting the user and storing the user input as a user-curated note in association with the new image, so that the user-curated note can be used to synthesize a 3D XR environment based on the new image. In some implementations, the method 300 includes prompting the user to capture an audio clip after detecting that the user has captured an image in order to record environmental sounds. In some implementations, the method 300 includes determining a likelihood of using the new image to create an XR environment (e.g., a portal) at a later time, and prompting the user to record a brief note regarding the new image in response to the likelihood being greater than a threshold. In some implementations, the likelihood of using the new image to create an XR environment is based on whether the user has requested the device to generate 3D XR environments based on similar images.

In some implementations, the method 300 includes detecting that the device has captured a photo of a physical picture. In such implementations, the method 300 includes prompting the user to provide information that is typically associated with metadata of a captured image. For example, the device may prompt the user to indicate a location associated with a subject in the physical picture because the location of the subject may be different from a location where the user captured a photo of the physical picture. As an example, if the user is in Los Angeles and the user captures a photo of a physical picture that shows the user in front of the Eiffel Tower, the device may prompt the user to provide a location of the Eiffel Tower. In some implementations, the device may modify the metadata of the captured photo based on the user's response (e.g., replace Los Angeles in a location data field of the metadata with Paris). In some implementations, the device can prompt the user to provide additional information such as a sound clip or a video clip. For example, if the user captures a photo of a physical picture that shows the user standing in front of Niagara Falls, the device may prompt the user to provide a link to an audio or a video that includes sounds of the Niagara Falls.

Figure 4:
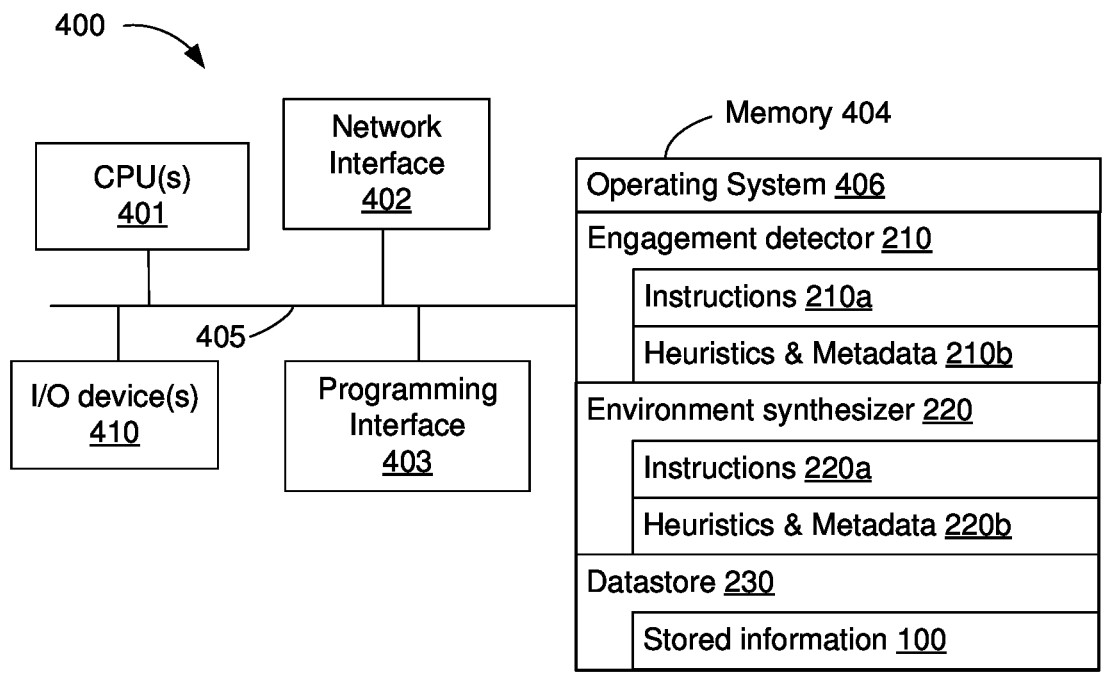
FIG. 4 is a block diagram of a device that synthesizes a 3D computer-generated environment in accordance with some implementations.

FIG. 4 is a block diagram of a device 400 that synthesizes a 3D computer-generated environment (e.g., the XR environment 140 shown in FIG. 1D) in accordance with some implementations. In some implementations, the device 400 implements the electronic device 20 shown in FIGS. 1A-1O, and/or the content generation engine 200 shown in FIGS. 1A-2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the engagement detector 210, the environment synthesizer 220 and the datastore 230. In various implementations, the device 400 performs the method 300 shown in FIG. 3.

In various implementations, the engagement detector 210 determines an engagement score that characterizes the level of engagement between a user and a representation of a subject included in an image. To that end, the engagement detector 210 includes instructions 210a, and heuristics and metadata 210b.

In various implementations, the environment synthesizer 220 synthesizes an XR environment based on the image and stored information regarding the subject. To that end, the environment synthesizer 220 includes instructions 220a, and heuristics and metadata 220b.

In various implementations, the datastore 230, stores the stored information 100. In some implementations, a portion of the stored information 100 is stored at a remote data source, for example, at a server or at another device. In such implementations, the device 400 obtains the stored information from the remote data source.

In various implementations, the one or more I/O devices 410 include an image sensor (e.g., a camera) for capturing images (e.g., the image 40 shown in FIG. 1A). In some implementations, the one or more I/O devices 410 include an audio sensor (e.g., a microphone) for receiving an audible signal. In some implementations, the one or more I/O devices 410 include a depth sensor (e.g., a depth camera) to capture the depth data. In some implementations, the one or more I/O devices 410 include a display for displaying a 3D computer-generated environment (e.g., the XR environment 140 shown in FIG. 1D). In some implementations, the one or more I/O devices 410 include a speaker for outputting an audible signal.

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a non-transitory memory and one or more processors coupled with the non-transitory memory:
determining an engagement score that characterizes a level of engagement between a user and an image; and
in response to the engagement score satisfying an engagement threshold:
obtaining metadata associated with the image; and
synthesizing a three-dimensional (3D) environment based on the image and the metadata associated with the image.

2. The method of claim 1, wherein the image includes a two-dimensional (2D) representation of a subject and the method further comprises accessing a user-curated note regarding the subject, the user-curated note specifying a characteristic of the subject that is not depicted in the image; and
wherein synthesizing the 3D environment includes generating a 3D representation of the subject based on the 2D representation of the subject included in the image and the characteristic of the subject specified in the user-curated note.

3. The method of claim 2, wherein the user-curated note describes a sound that the subject was generating when the device captured the image; and
wherein synthesizing the 3D environment includes associating the sound with the 3D representation of the subject in order to provide an appearance that the 3D representation of the subject is generating the sound.

4. The method of claim 2, wherein the user-curated note describes a movement of the subject when the device captured the image; and
wherein synthesizing the 3D environment includes animating the 3D representation of the subject in accordance with the movement described in the user-curated note in order to provide an appearance that the 3D representation of the subject is moving in accordance with the movement described in the user-curated note.

5. The method of claim 2, wherein the user-curated note indicates that an object not depicted in the image was within a threshold distance of the subject when the device captured the image; and
wherein synthesizing the 3D environment includes placing a 3D representation of the object within the threshold distance of a 3D representation of the subject.

6. The method of claim 2, wherein the user-curated note indicates a size of the subject; and
wherein synthesizing the 3D environment includes generating a 3D representation of the subject with a virtual dimension that is based on the size indicated by the user-curated note.

7. The method of claim 2, further comprising obtaining publicly-available images of the subject and generating the 3D representation of the subject based on the publicly-available images of the subject.

8. The method of claim 2, wherein the subject includes an object represented in the image.

9. The method of claim 2, wherein the subject includes environmental conditions represented in the image.

10. The method of claim 2, wherein the subject includes a physical environment represented in the image, and the method further comprises detecting a user selection of the image in an application.

11. The method of claim 1, wherein the metadata indicates a geographic location where the device captured the image; and
wherein synthesizing the 3D environment includes:
determining a characteristic of the geographic location; and
representing the characteristic of the geographic location in the 3D environment.

12. The method of claim 11, wherein the characteristic is an acoustic characteristic that indicates an ambient sound of the geographic location; and
wherein synthesizing the 3D environment includes integrating the ambient sound in the 3D environment.

13. The method of claim 11, wherein the characteristic is an environmental characteristic that indicates an environmental condition of the geographic location; and
wherein synthesizing the 3D environment includes synthesizing the 3D environment with a virtual environmental condition that matches the environmental condition of the geographic location.

14. The method of claim 11, further comprising obtaining map data that indicates a topography of the geographic location where the device captured the image; and
wherein synthesizing the 3D environment includes synthesizing the 3D environment with a virtual topography that matches the topography of the geographic location.

15. The method of claim 1, further comprising obtaining an audio associated with a physical environment where the image was captured and integrating the audio into the 3D environment.

16. The method of claim 1, wherein obtaining the metadata includes retrieving the metadata from the non-transitory memory.

17. The method of claim 1, wherein obtaining the metadata includes receiving the metadata from another device.

18. A non-transitory memory storing one or more programs, which, when executed by one or more processors of a device, cause the device to:

determine an engagement score that characterizes a level of engagement between a user and a two-dimensional (2D) representation of a subject included in an image; and in response to the engagement score satisfying an engagement threshold:
- obtain stored information regarding the subject, wherein the stored information includes metadata associated with the image; and
- synthesize a three-dimensional (3D) environment based on a plurality of pixels in the image and the metadata associated with the image.

19. The non-transitory memory of claim 18, wherein obtaining the stored information includes accessing a user-curated note regarding the subject, the user-curated note specifying a characteristic of the subject that is not depicted in the image; and
wherein synthesizing the 3D environment includes generating a 3D representation of the subject based on the 2D representation of the subject included in the image and the characteristic of the subject specified in the user-curated note.

20. The non-transitory memory of claim 19, wherein the user-curated note describes a sound that the subject was generating when the device captured the image; and
wherein synthesizing the 3D environment includes associating the sound with the 3D representation of the subject in order to provide an appearance that the 3D representation of the subject is generating the sound.

21. The non-transitory memory of claim 19, wherein the user-curated note indicates that an object not depicted in the image was within a threshold distance of the subject when the device captured the image; and
wherein synthesizing the 3D environment includes placing a 3D representation of the object within the threshold distance of a 3D representation of the subject.

22. The non-transitory memory of claim 18, wherein obtaining the stored information includes identifying a geographic location where the device captured the image; and
wherein synthesizing the 3D environment includes:
- determining a characteristic of the geographic location; and
- representing the characteristic of the geographic location in the 3D environment.

23. The non-transitory memory of claim 22, wherein the characteristic is an acoustic characteristic that indicates an ambient sound of the geographic location; and
wherein synthesizing the 3D environment includes integrating the ambient sound in the 3D environment.

24. A device comprising:
one or more processors;
a non-transitory memory;
one or more displays; and
one or more programs stored in the non-transitory memory, which, when executed by the one or more processors, cause the device to:
- determine an engagement score that characterizes a level of engagement between a user and a two-dimensional (2D) representation of a subject included in an image; and
- in response to the engagement score satisfying an engagement threshold:
  - obtain stored information regarding the subject, wherein the stored information includes metadata associated with the image; and
  - synthesize a three-dimensional (3D) environment based on a plurality of pixels in the image and the metadata associated with the image.

25. The device of claim 24, wherein obtaining the stored information includes accessing a user-curated note regarding the subject, the user-curated note specifying a characteristic of the subject that is not depicted in the image; and
wherein synthesizing the 3D environment includes generating a 3D representation of the subject based on the 2D representation of the subject included in the image and the characteristic of the subject specified in the user-curated note.

26. The device of claim 25, wherein the user-curated note describes a movement of the subject when the device captured the image; and
wherein synthesizing the 3D environment includes animating the 3D representation of the subject in accordance with the movement described in the user-curated note in order to provide an appearance that the 3D representation of the subject is moving in accordance with the movement described in the user-curated note.

27. The device of claim 24, wherein obtaining the stored information includes identifying a geographic location where the device captured the image; and
wherein synthesizing the 3D environment includes:
- determining a characteristic of the geographic location; and
- representing the characteristic of the geographic location in the 3D environment.

28. The device of claim 27, wherein the characteristic is an environmental characteristic that indicates an environmental condition of the geographic location; and
wherein synthesizing the 3D environment includes synthesizing the 3D environment with a virtual environmental condition that matches the environmental condition of the geographic location.

29. The device of claim 24, wherein the stored information includes publicly-available images of the subject or an audio associated with a physical environment where the image was captured.

* * * * *